(12) United States Patent
Mix

(10) Patent No.: US 7,686,550 B2
(45) Date of Patent: Mar. 30, 2010

(54) CONTAINER FOR PACKAGING AND TRANSPORTING GLASS SHEET(S)

(75) Inventor: Stephen William Mix, Elmira, NY (US)

(73) Assignee: Corning Incorporated, Corning, NY (US)

( * ) Notice: Subject to any disclaimer, the term of this patent is extended or adjusted under 35 U.S.C. 154(b) by 545 days.

(21) Appl. No.: 11/732,368

(22) Filed: Apr. 3, 2007

(65) Prior Publication Data
US 2008/0152453 A1   Jun. 26, 2008

Related U.S. Application Data

(60) Provisional application No. 60/876,267, filed on Dec. 21, 2006.

(51) Int. Cl.
*B60P 7/08* (2006.01)
(52) U.S. Cl. .............. 410/34; 410/32; 410/43; 410/127
(58) Field of Classification Search .......... 410/31, 410/32, 34, 35, 38, 43, 87, 127, 128; 206/451, 206/454, 449; 211/72, 169, 169.1, 41.1, 211/198, 41.14, 41.15; 220/1.5
See application file for complete search history.

(56) References Cited

U.S. PATENT DOCUMENTS

| 697,463 | A | 4/1902 | Ferres |
|---|---|---|---|
| 2,595,079 | A | 4/1952 | Itaya |
| 3,645,389 | A | 2/1972 | Castiaux |
| 3,838,779 | A | 10/1974 | Dawson |
| 5,379,904 | A | 1/1995 | Brown |
| 5,576,220 | A | 11/1996 | Hudson et al. |
| 5,860,539 | A | 1/1999 | Brown |
| 5,909,808 | A | 6/1999 | Bartholomew |
| 6,247,601 | B1 | 6/2001 | Norton et al. |
| 6,527,120 | B2 | 3/2003 | Okamoto |
| 7,182,559 | B1 * | 2/2007 | Groth et al. ............ 410/32 |
| 2002/0070140 | A1 | 6/2002 | Okamoto |
| 2003/0085145 | A1 | 5/2003 | Okamoto |
| 2003/0181302 | A1 | 9/2003 | Kaiser et al. |
| 2007/0017841 | A1 | 1/2007 | Mix et al. |

FOREIGN PATENT DOCUMENTS

| DE | 2 317 346 | 4/1973 |
|---|---|---|
| EP | 1 533 250 | 5/2005 |
| EP | 1533251 | 5/2005 |
| JP | 08-175584 | 7/1996 |

(Continued)

*Primary Examiner*—Stephen Gordon
(74) *Attorney, Agent, or Firm*—Kevin M. Able

(57) ABSTRACT

A container is described herein which uses three different types of restraining mechanisms to help secure glass sheets therein so that the glass sheets can be safely transported from one facility (e.g., a manufacturing facility) to a second facility (e.g., a customer facility). The first type of restraining mechanism includes two collapsible retainer bar mechanisms which are connected to one another by a support bar that can be moved so as to secure the major surfaces of the glass sheets. The second type of restraining mechanism includes two side restraints which are used to help secure the two opposing sides of the glass sheets. The third type of restraining mechanism includes two secondary retainer mechanisms each of which has a stopper that is moved to help secure/support the bottom portion of the glass sheets.

12 Claims, 22 Drawing Sheets

FOREIGN PATENT DOCUMENTS

| | | |
|---|---|---|
| JP | 09-188327 | 7/1997 |
| JP | 11-115978 | 4/1999 |
| JP | 2000 142856 | 5/2000 |
| JP | 2000-191065 | 7/2000 |
| JP | 2000 203679 | 7/2000 |
| JP | 2000-272684 | 10/2000 |
| JP | 2001-354281 | 12/2001 |
| JP | 2002 037371 | 2/2002 |
| JP | 2002-037372 | 2/2002 |
| JP | 2002-037373 | 2/2002 |
| JP | 2002-037374 | 2/2002 |
| JP | 2003-026268 | 1/2003 |
| JP | 2003-137287 | 5/2003 |
| JP | 2003-237833 | 8/2003 |
| JP | 2004-018070 | 1/2004 |
| JP | 2004 018092 | 1/2004 |
| JP | 2004 244073 | 9/2004 |
| JP | 2004250015 A | 9/2004 |
| WO | WO2005/035394 A1 | 4/2005 |

\* cited by examiner

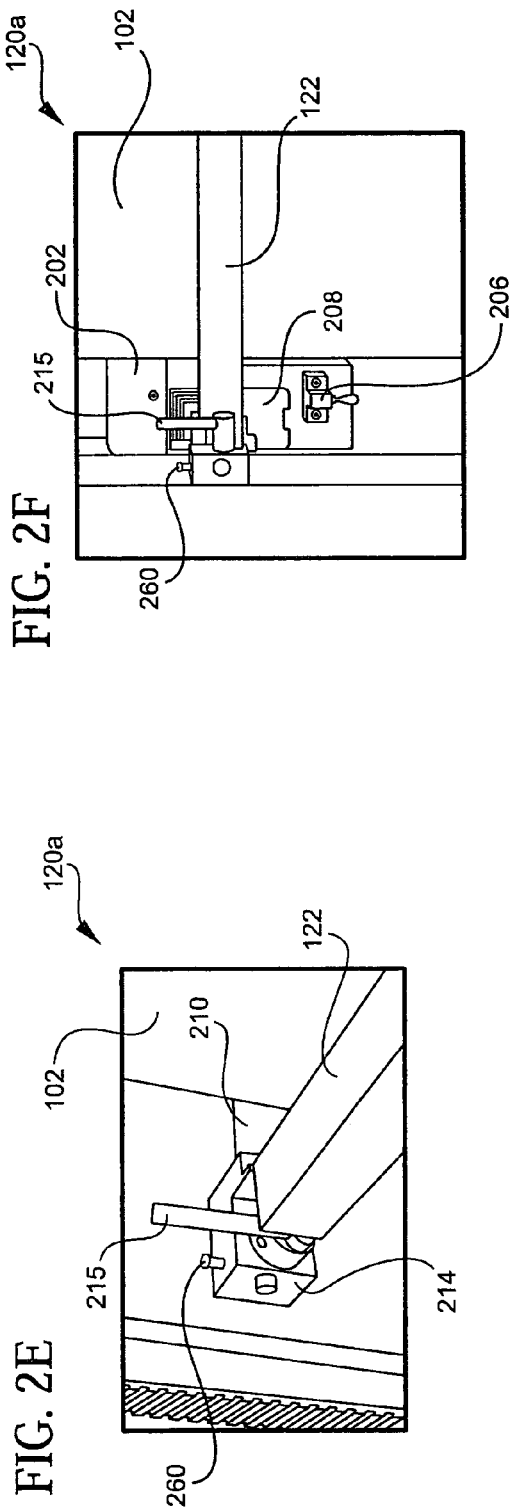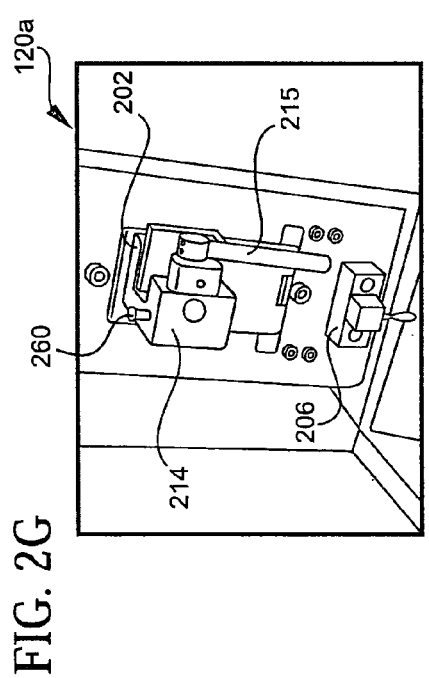

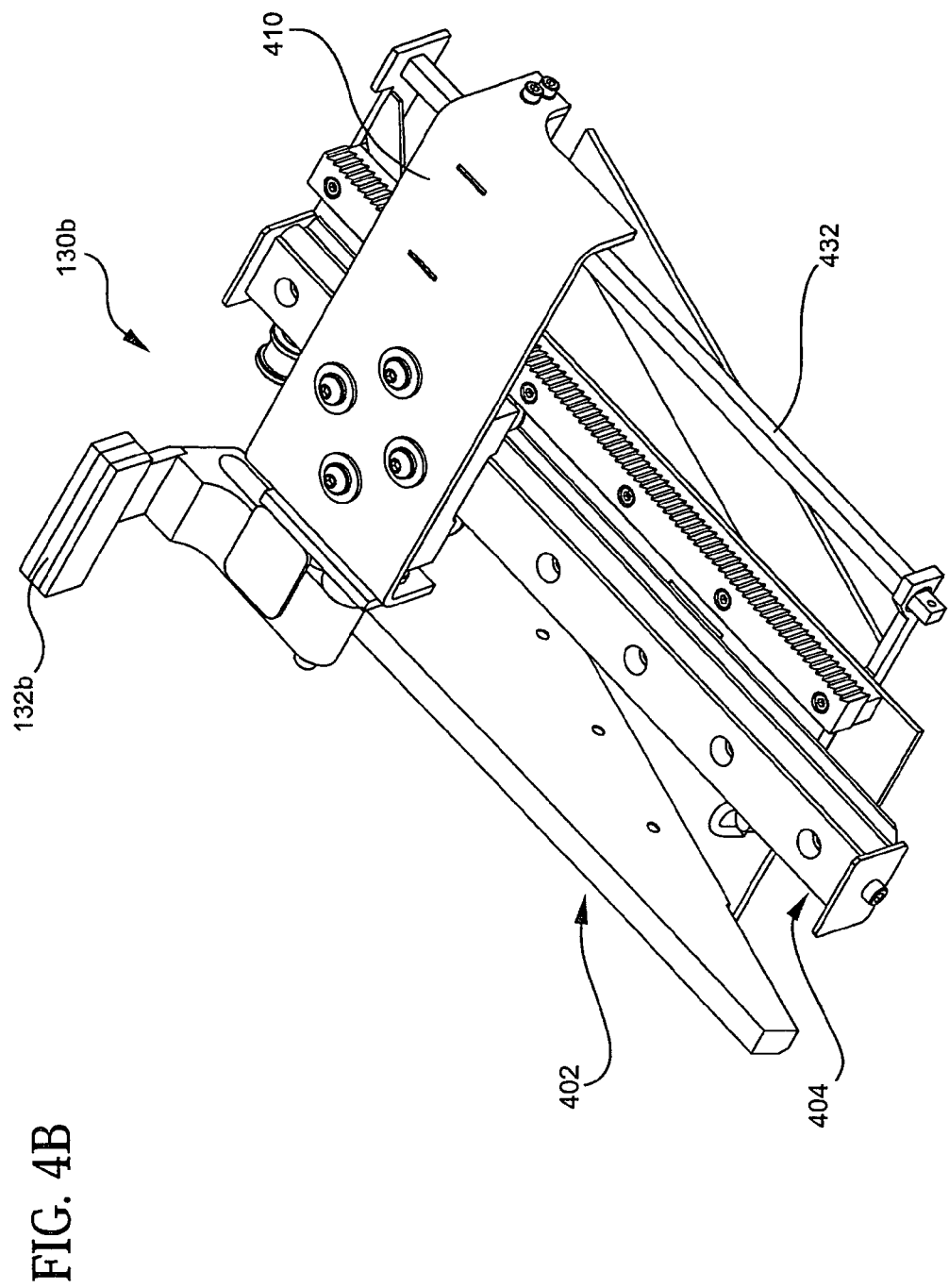

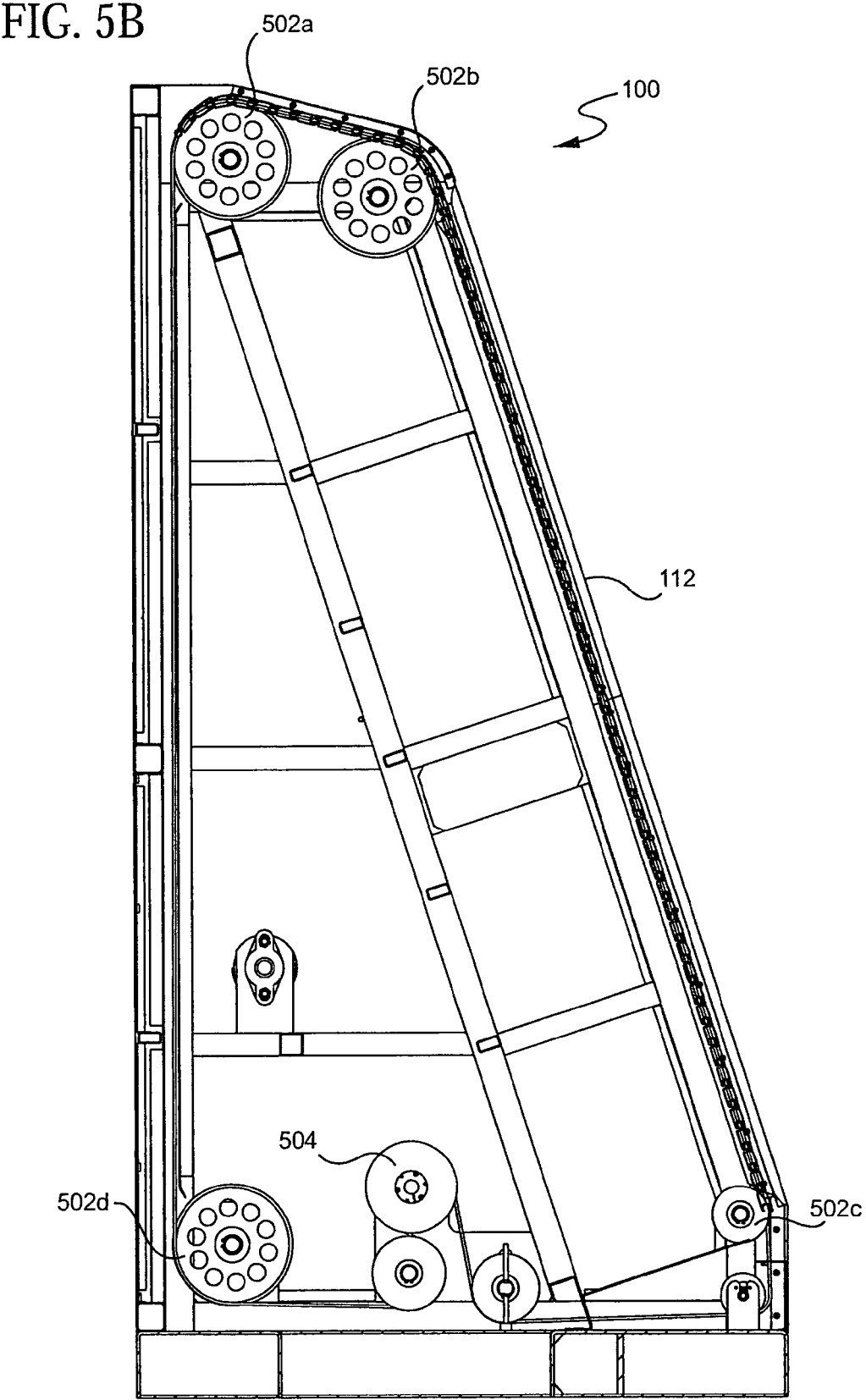

CONTAINER FOR PACKAGING AND TRANSPORTING GLASS SHEET(S)

CLAIMING BENEFIT OF PRIOR FILED U.S. APPLICATION

This application claims the benefit of U.S. Provisional Application Ser. No. 60/876,267 filed on Dec. 21, 2006 and entitled "Container for Packaging and Transporting Glass Sheet(s)". The contents of this document are hereby incorporated by reference herein.

CROSS REFERENCE TO RELATED APPLICATION

This application is related to U.S. patent application Ser. No. 11/187,339 which was filed Jul. 22, 2005 and entitled "Restraining Dense Packaging System for LCD Glass Sheets". The contents of this document are hereby incorporated by reference herein.

TECHNICAL FIELD

The present invention relates to a container which is used to package and transport a stack of glass sheets, such as Gen 7 glass substrates or even larger glass substrates that can be used to make for example Liquid Crystal Display (LCD) televisions.

BACKGROUND

In the past, containers known as "dense packs" have been used in the glass industry to provide safe, high density and cost-effective transportation of large glass sheets such as Gen 5 glass sheets (e.g., LCD panels, Thin Film Transistor panels, Color Filter panels). However, as glass sheets have become even larger such as with the Gen 7 glass sheets and beyond, new challenges have arisen for dense packaging, particularly around the size and weight of the container components, which become even more unwieldy for operators to handle, as well as transportation constraint issues like transporting containers through standard size doors, finding properly sized shipping containers and standard trucks. To help address these needs, the assignee of the present invention has designed several different glass containers which have been disclosed in U.S. patent application Ser. No. 11/187,339. Although these containers work well there is still a desire to design a new and improved container which can be used to safely and effectively transport a stack of glass sheets. This particular need and other needs have been satisfied by the container of the present invention.

SUMMARY

The container described herein uses three different types of restraining mechanisms to help secure glass sheets therein so that the glass sheets can be safely transported from one facility (e.g., a manufacturing facility) to a second facility (e.g., a customer facility). The first type of restraining mechanism includes two collapsible or telescoping retainer bar mechanisms which are connected to one another by a support bar that can be moved to secure the major surface of the glass sheets. The second type of restraining mechanism includes two side restraints which are used to help secure the two opposing sides of the glass sheets. The third type of restraining mechanism includes two secondary retainer mechanisms each of which has a stopper that is moved to help secure/ support the bottom portion of the glass sheets. All restraining mechanisms are designed to accommodate variations in the size and number (from 1 to N) of glass sheets packaged, as well as variations in glass position and density within the stack of glass sheets. Each mechanism may be individually and reversibly locked in position to mitigate the effects of vibration during transportation.

BRIEF DESCRIPTION OF THE DRAWINGS

A more complete understanding of the present invention may be obtained by reference to the following detailed description when taken in conjunction with the accompanying drawings wherein:

FIGS. 2A-2G are seven diagrams illustrating different views of the first type of restraining mechanism which includes two collapsible retainer bar mechanisms that when connected to one another by the support bar can be used to help secure the major surface of the glass sheets in accordance with the present invention;

FIGS. 4A-4F are six diagrams illustrating different views of the third type of restraining mechanism which includes two secondary retainer mechanisms that are used to help secure/ support the bottom portion of the glass sheets in accordance with the present invention;

FIGS. 5A-5F are six diagrams which are used to help explain the structure and operation of the door which is movably secured to the container in accordance with the present invention;

DETAILED DESCRIPTION

Figure 1A:
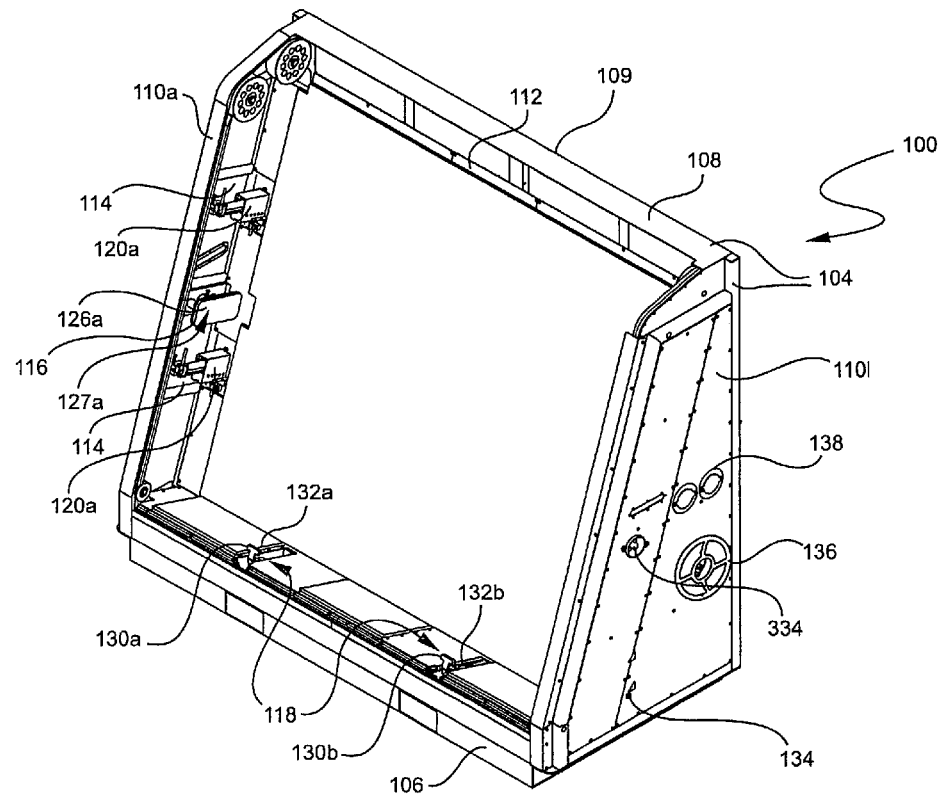
FIGS. 1A-1C are diagrams of a container which has three different types of restraining mechanisms that help secure a stack of glass sheets therein in accordance with the present invention.
Figure 1B:
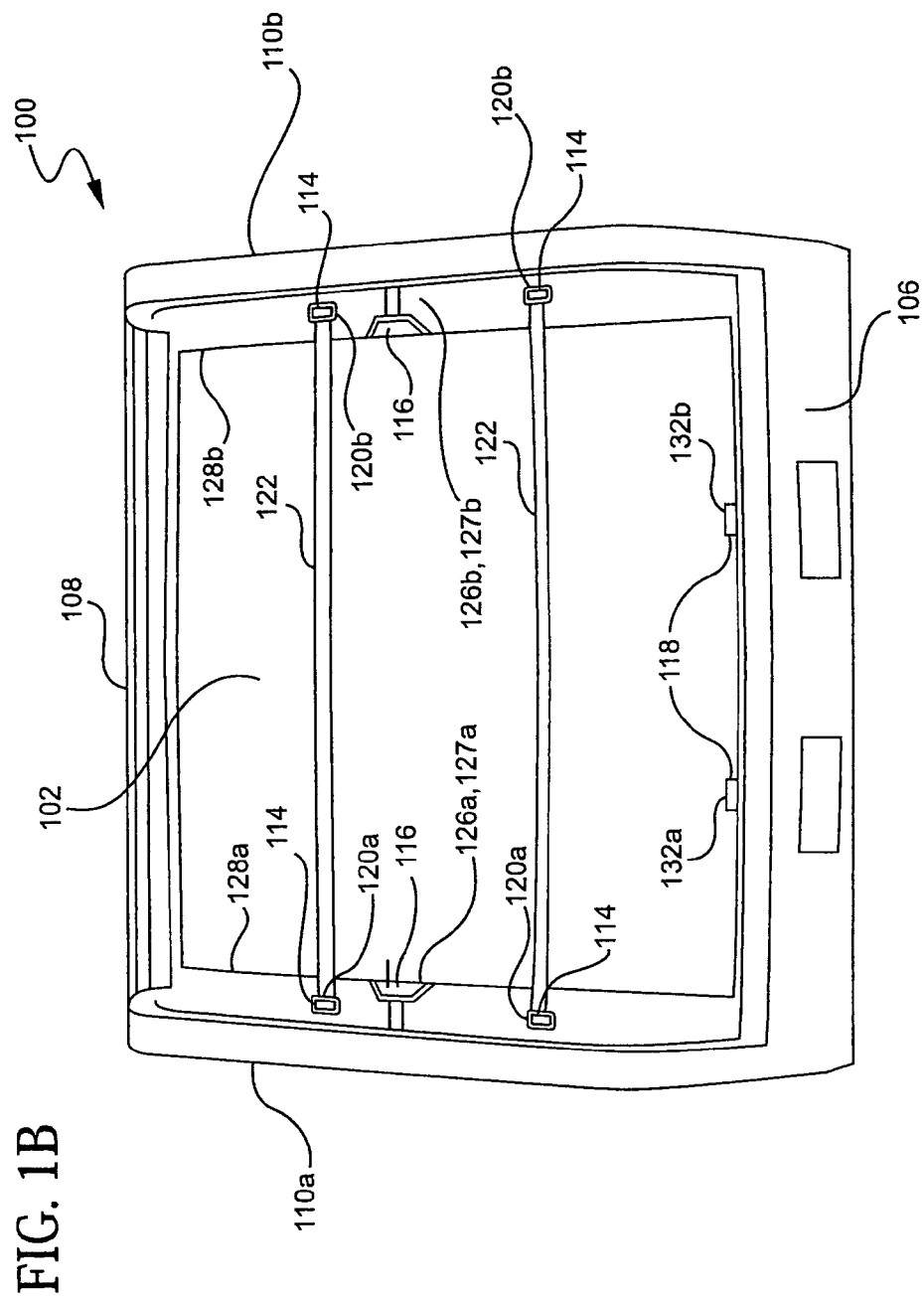
Figure 1C:
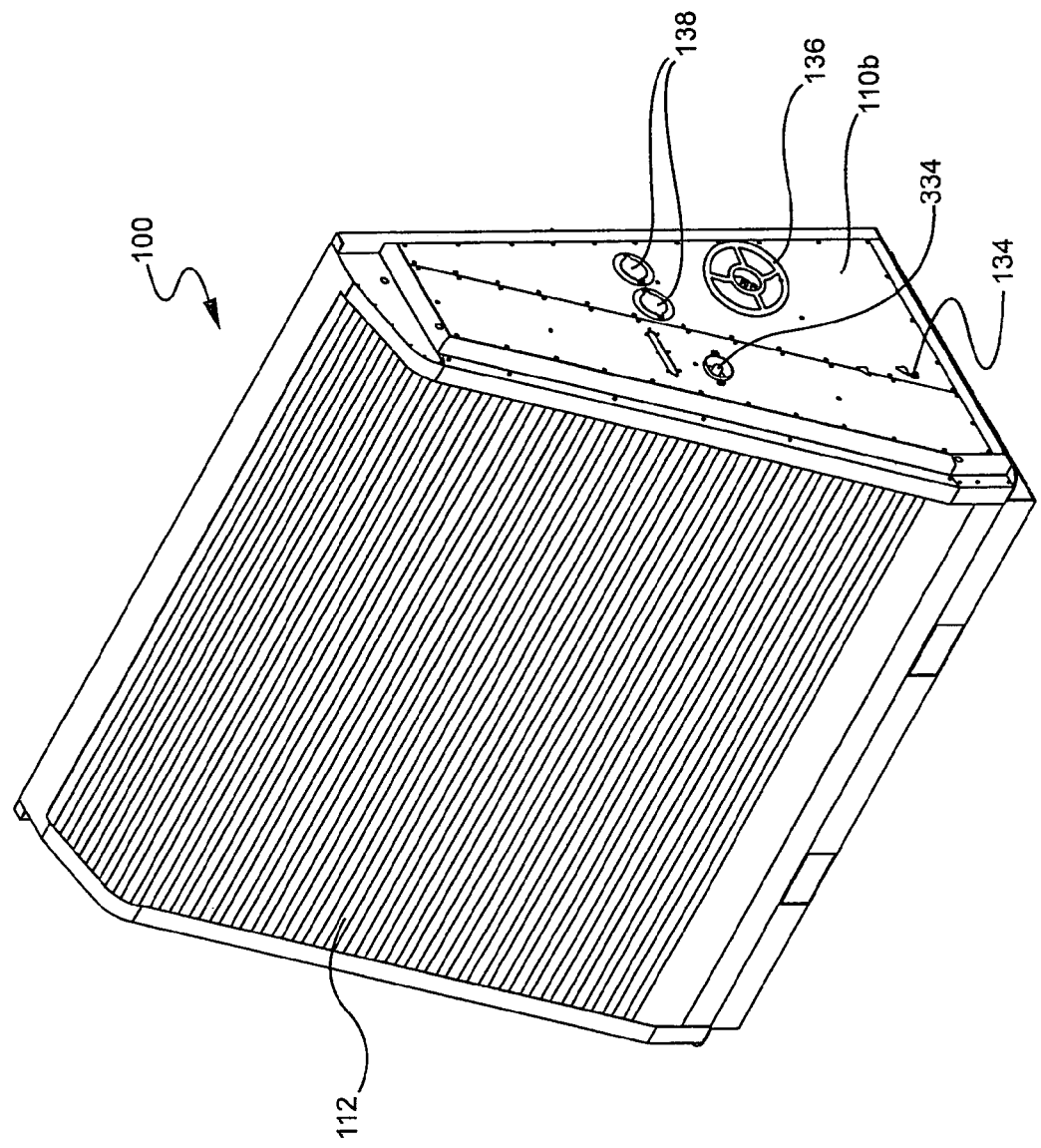

Referring to FIGS. 1A-1C, there are three different diagrams of a container 100 which is designed to package and transport a stack of glass sheets 102 in accordance with the present invention. The container 100 includes a frame 104 which has a bottom side 106 (pallet 106), a top side 108, a back side 109, and two opposite side walls 110a and 110b. The two side walls 110a and 110b extend from the bottom side 106, the top side 108 and the back side 109 to define an interior space for accommodating one or more glass sheets 102. The container 100 includes a door 112 which is movably secured to the frame 104 such that when the door 112 is in an open position then the glass sheets 102 (if present) could be accessed and when the door 112 is in a closed position then the glass sheets 102 (if present) would be enclosed and protected.

The container 100 also includes three different types of restraining mechanisms 114, 116 and 118 which preferably function together to help restrain/secure the enclosed glass sheets 102. The first restraining mechanism 114 includes a first collapsible (telescoping) retainer bar mechanisms 120a (located adjacent to side wall 110a) and a second collapsible (telescoping) retainer bar mechanisms 120b (located adjacent to side wall 110b). The two collapsible retainer bar mechanisms 120a and 120b can be connected to one another by a removable support bar 122 which can be moved towards the back side 109 of the frame 104 until the support bar 122 contacts a major surface of the glass sheets 102 in a manner that helps secure the glass sheets 102 (note 1: the support bars 122 and the glass sheets 102 for clarity are not shown in FIG. 1A) (note 2: two sets of the first restraining mechanism 114 are being used in the exemplary container 100 shown in FIGS. 1A-1C). Each collapsible mechanism can be adjusted independently of the others in order to accommodate variations in glass packing density and position of the glass. The mechanisms can be reversibly locked in order to mitigate the loosening effects of vibration during transportation.

The second restraining mechanism 116 includes two side restraints 126a and 126b where the first side restraint 126a (located adjacent to side wall 110a) has a protective plate 127a that is moved until it contacts one side 128a of the glass sheets 102 and the second side restraint 126b (located adjacent to side wall 110b) has a protective plate 127b that is moved until it contacts another side 128b of the glass sheets 102 so as to help secure both sides 128a and 128b of the glass sheets 102. Each side restraint can be reversibly locked to mitigate the loosening effects of vibration during transportation.

The third restraining mechanism 118 includes a pair of secondary retainer mechanisms 130a and 130b both of which are located adjacent to a bottom side 106 of the frame 104 and both of which have a stopper 132a and 132b that is moved from a disengaging position into an engaging position and then pushed towards the back side 109 of the frame 104 to support a bottom portion of the glass sheets 102 so as to help prevent the glass sheets 102 from slipping forward when for instance the support bar 122 has been removed from between the two collapsible retainer bar mechanisms 120a and 120b. A detailed discussion about the structure and function of these exemplary restraining mechanisms 114, 116 and 118 is provided next with respect to FIGS. 2-4.

Referring to FIGS. 2A-2G, there are seven diagrams illustrating different views of the first type of restraining mechanism 114 which includes two collapsible retainer bar mechanisms 120a and 120b that when connected to one another by the support bar 122 can be used to secure the major surface of the glass sheets 102 in accordance with the present invention (note: only retainer bar mechanism 120a is shown in this set of drawings). Each collapsible retainer bar mechanism 120a and 120b includes: (1) a mounting bracket 202 (which has a locking/unlocking actuator 206); (2) a body 208; and (3) a rod 210 (which has a support unit 214/cam lever 215 that are configured to receive and secure an end of the support bar 122) (see FIG. 2E). A detailed listing of the various components associated with the mounting bracket 202, the body 208 and the rod 210 is provided after a brief discussion about the functionality of the collapsible retainer bar mechanisms 120a and 102b.

Figure 2A:
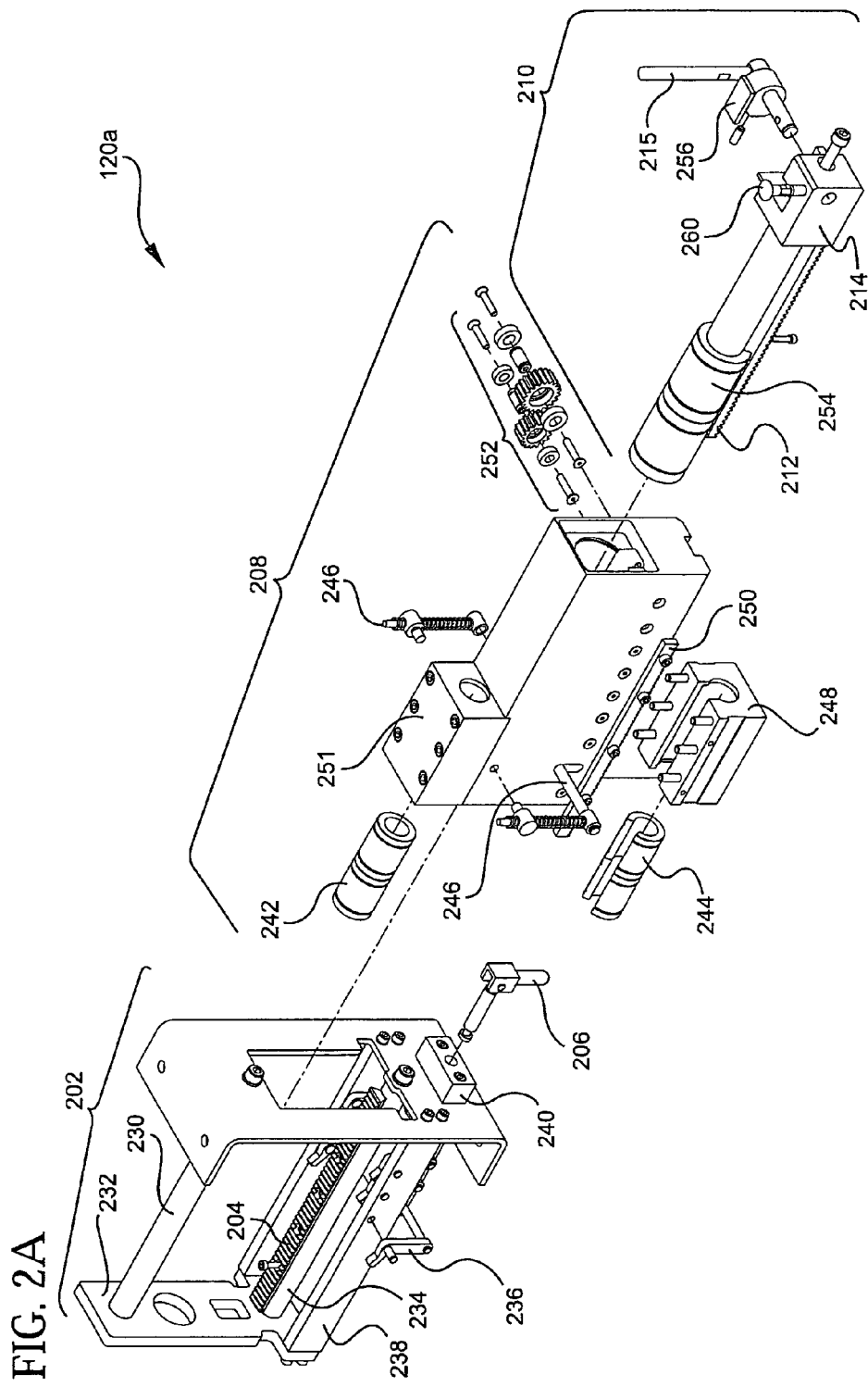
Figure 2C:
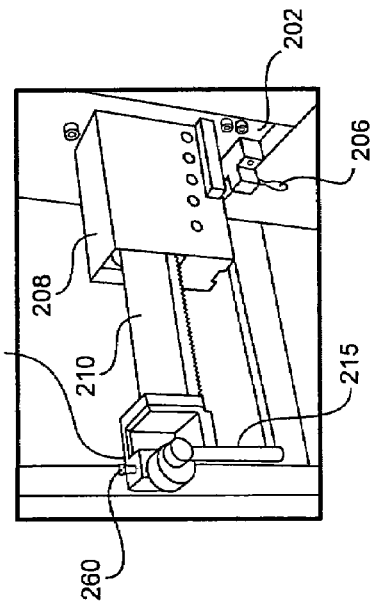
Figure 2B:
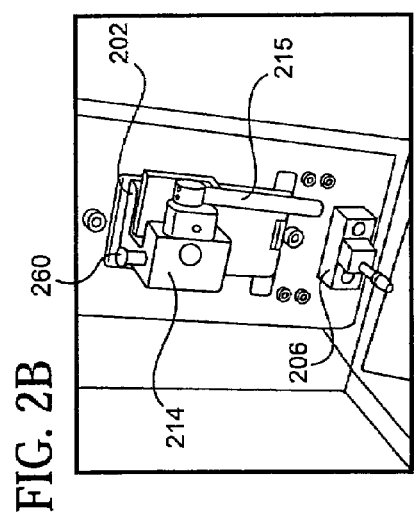

Basically, when the two collapsible retainer bar mechanisms 120a and 120b are in the unlocked position (i.e., the locking/unlocking actuators 206 are in the "up" position), then the rod 210 and body 208 can be moved with respect to the mounting bracket 202. For instance, FIG. 2B illustrates the collapsible retainer bar mechanism 120a in the unlocked position where the body 208 and rod 210 are both pushed within the mounting bracket 202 (compare to FIG. 2G, where the mechanism is in the locked position). In the unlocked position, the user can grab and pull on the support unit 214a so as to extend the rod 210 and the body 208 out from the mounting bracket 202 (see FIGS. 2C-2F). At this point, the two collapsible retainer bar mechanisms 120a and 120b can be connected to one another by a removable support bar 122 which is then moved towards the back side 109 of the frame 104 until the support bar 122 contacts a major surface of the exposed glass sheet 102 (see FIG. 2D). Thereafter, the support bar 122 is secured within the support units 214 of both rods 210 by moving the cam levers 215 from a vertical-down orientation to a vertical-up orientation (see FIGS. 2D-2F). Plus, the two collapsible retainer bar mechanisms 120a and 120b are placed in a locked position (i.e., when the locking/unlocking actuators 206 are in the "down" position) so as to secure the glass sheets 102 (see FIG. 2F). As can be seen, the two collapsible retainer bar mechanisms 120a and 120b when connected to one another by the support bar 122 can be used to secure 1 to N glass sheets 102 without needing to use supplemental spacing components (dunnage).

Referring back to FIG. 2A, there is shown an exploded view of one collapsible retainer bar mechanism 120a (without the support bar 122) which illustrates in greater detail the different components and the configurations of those components which are used to make the mounting bracket 202, the body 208 and the rod 210. These components are as follows:

Retainer Bar Mechanism 120a
    Mounting Bracket 202
    gear track 204
    locking/unlocking actuator 206
    rod 230
    back plate 232
    gear track support 234
    lever release 236
    plate side 238
    mount 240
    Body 208
    bearing (connection rod) 242
    bearing (gear track) 244
    pin/spring mount 246
    bearing support 248
    gear track 250
    connection rod bearing support 251
    bearings/gears 252
    Rod 210
    gear track 212
    support unit 214
    cam lever 215
    bearing (gear track) 254
    lock plate retainer bar 256

It is important to understand that the collapsible retainer bar mechanisms 120a and 120b shown and described herein are exemplary and that different types/configurations of collapsible retainer bar mechanisms could be used instead so long as those collapsible retainer bar mechanisms can be used to secure 1 to N glass sheets 102. Moreover, it is important to understand that the container 100 may incorporate as many pairs of the collapsible retainer bar mechanisms 120a and 120b as are needed to properly secure the glass sheets 102 (note: two pairs of the collapsible retainer bar mechanisms 120a and 120b have been shown in the FIGS. 1A-1C).

Referring to FIGS. 3A-3D, there are four diagrams illustrating different views of the second type of restraining mechanism 116 which includes two side restraints 126a and 126b that are used to secure the sides 128a and 128b of the glass sheets 102 in accordance with the present invention (note: only side restrain 126b is shown in this set of drawings). The side restraint 126b includes a support plate 302

Figure 3A:
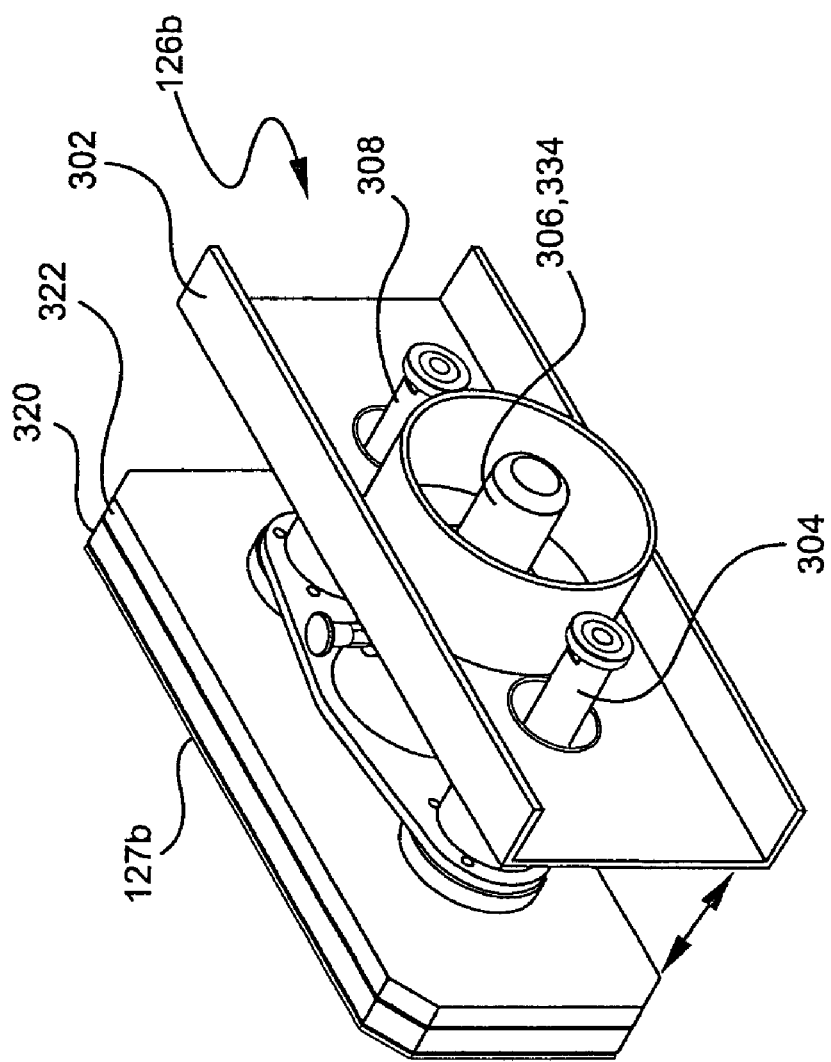
FIGS. 3A-3D are four diagrams illustrating different views of the second type of restraining mechanism which includes two side restraints that are used to help secure the two opposing sides of the glass sheets in accordance with the present invention.
Figure 3B:
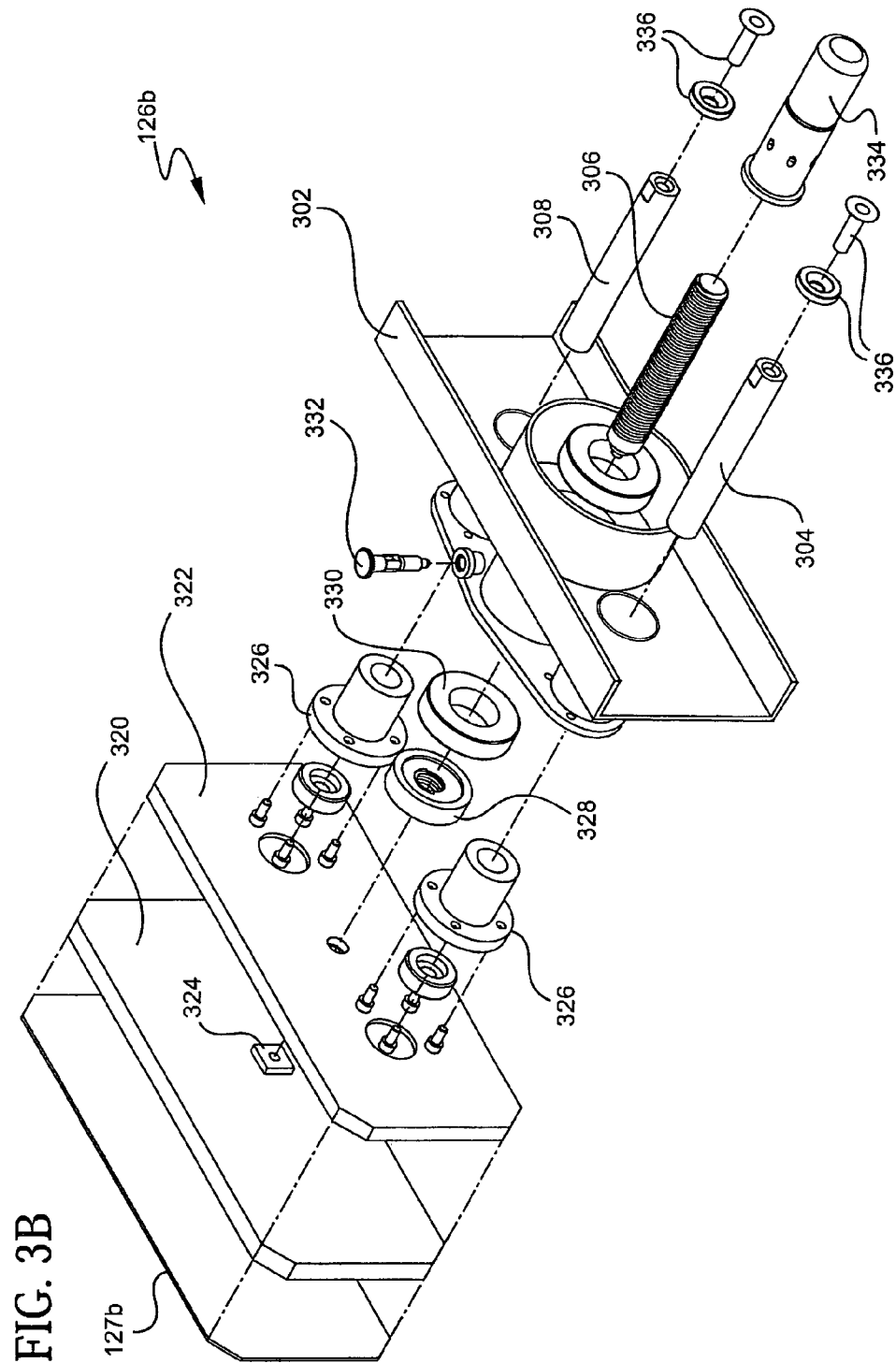
Figure 3D:
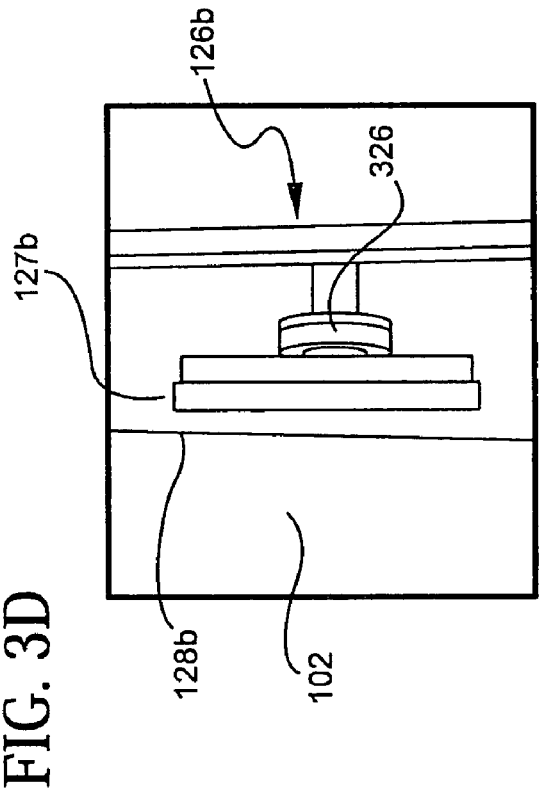

(attached to side wall 110b) which is connected by one or more shafts 304, 306 and 308 to a protective plate 127b. In operation, one of the shafts 306 is turned one-way via knob 334 (located on the outside of the container 100—see FIG. 1A) to move the protective plate 127b away from the support plate 302 so that the protective plate 127b can contact and secure the side 128b of the glass sheets 102 (see FIG. 3C). If the shaft 306 is turned the other-way, then the protective plate 127b is moved towards the support plate 302 such that the protective plate 127b no longer contacts the side 128b of the glass sheets 102 (see FIGS. 3A-3B and 3D). The other side restraint 126a functions in the same manner to secure side 128a of the glass sheets 102. As can be seen, the side restraints 126a and 126b would permit a great deal of flexibility in enabling a user to secure different sized glass sheets 102. FIGS. 3A and 3B respectively show a perspective view and an exploded view of one side restraint 126b which illustrate in greater detail the different components and the configurations of those components that make-up the side restraint 126b. These components are as follows:

Side Restraint 126b
support plate 302
protective plate 127b
shafts 304, 306 and 308
cushion 320
pressure plate 322
shaft support 324
bushings 326
ring 328
bearing ring 330
locking pin 332
knob 334
ring stopper assembly 336

It is important to understand that the side restraints 126a and 126b shown and described herein are exemplary and that different types/configurations of side restraints could be used instead so long as those side restraints can be used to secure the sides 110a and 110b of the glass sheets 102. Moreover, it is important to understand that the container 100 may incorporate as many pairs of the side restraints 126a and 126b as are needed to properly secure the sides 110a and 110b of the glass sheets 102 (note: one pair of side restraints 126a and 126b have been shown in the FIGS. 1A-1C).

Referring to FIGS. 4A-4F, there are six diagrams illustrating different views of the third type of restraining mechanism 118 which includes two secondary retainer mechanisms 130a and 130b that are used to secure/support the bottom portion of the glass sheets 102 in accordance with the present invention. Each secondary retainer mechanisms 130a and 130b (which are located adjacent to the bottom side 106 of the frame 104) includes: (1) a rail glide stopper assembly 402; (2) a rail linear glide 404 (which has a gear track 406 and a linear slide 408); and (3) a mounting bracket 410 (which has the stopper 132a and 132b and a pawl 412) (see FIGS. 4A-4C). A detailed listing of the various components associated with the rail glide stopper assembly 402, the rail linear glide 404 and the mounting bracket 410 is provided after a brief discussion about the functionality of the secondary retainer mechanisms 130a and 130b.

Figure 4A:
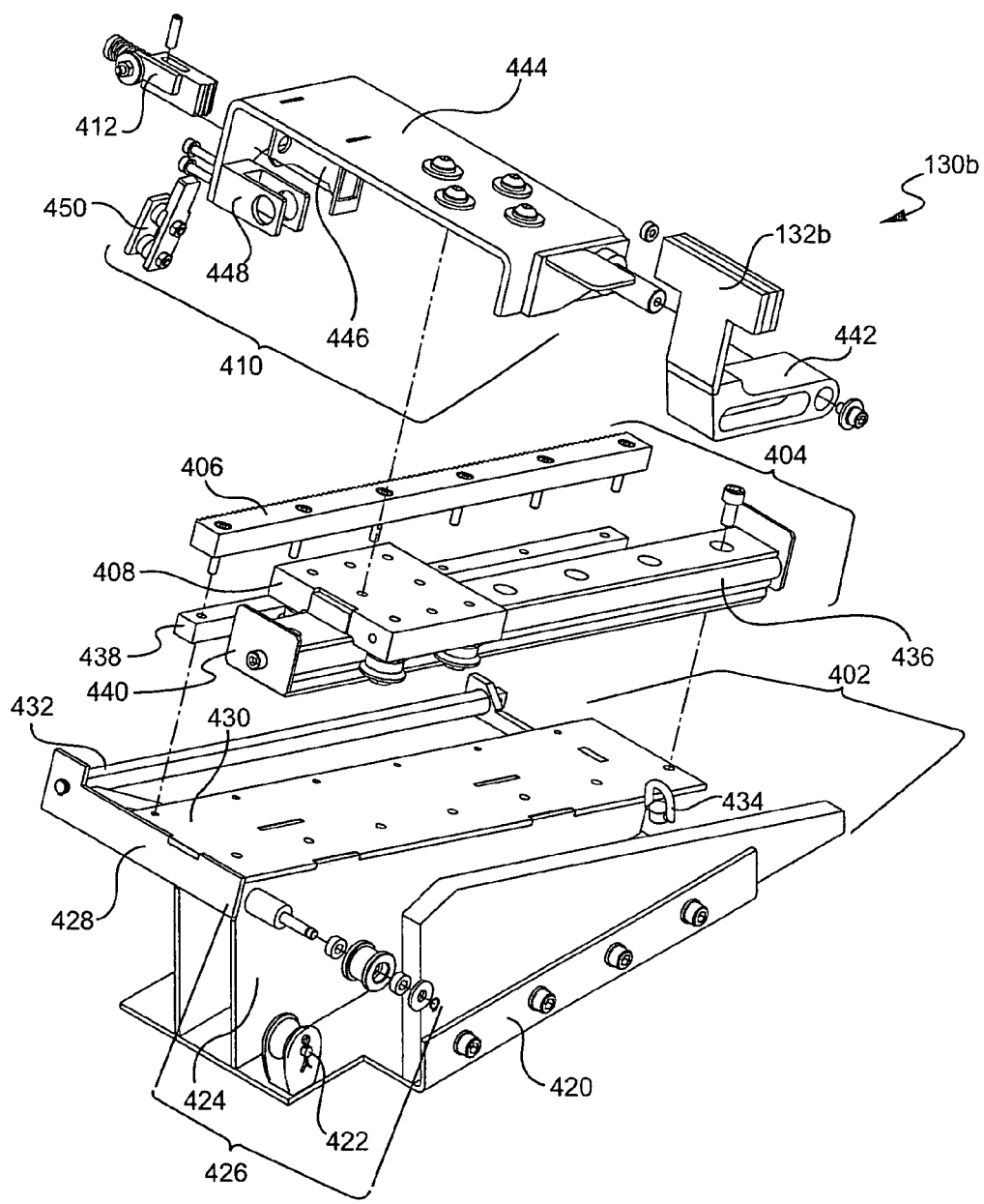
Figure 4C:
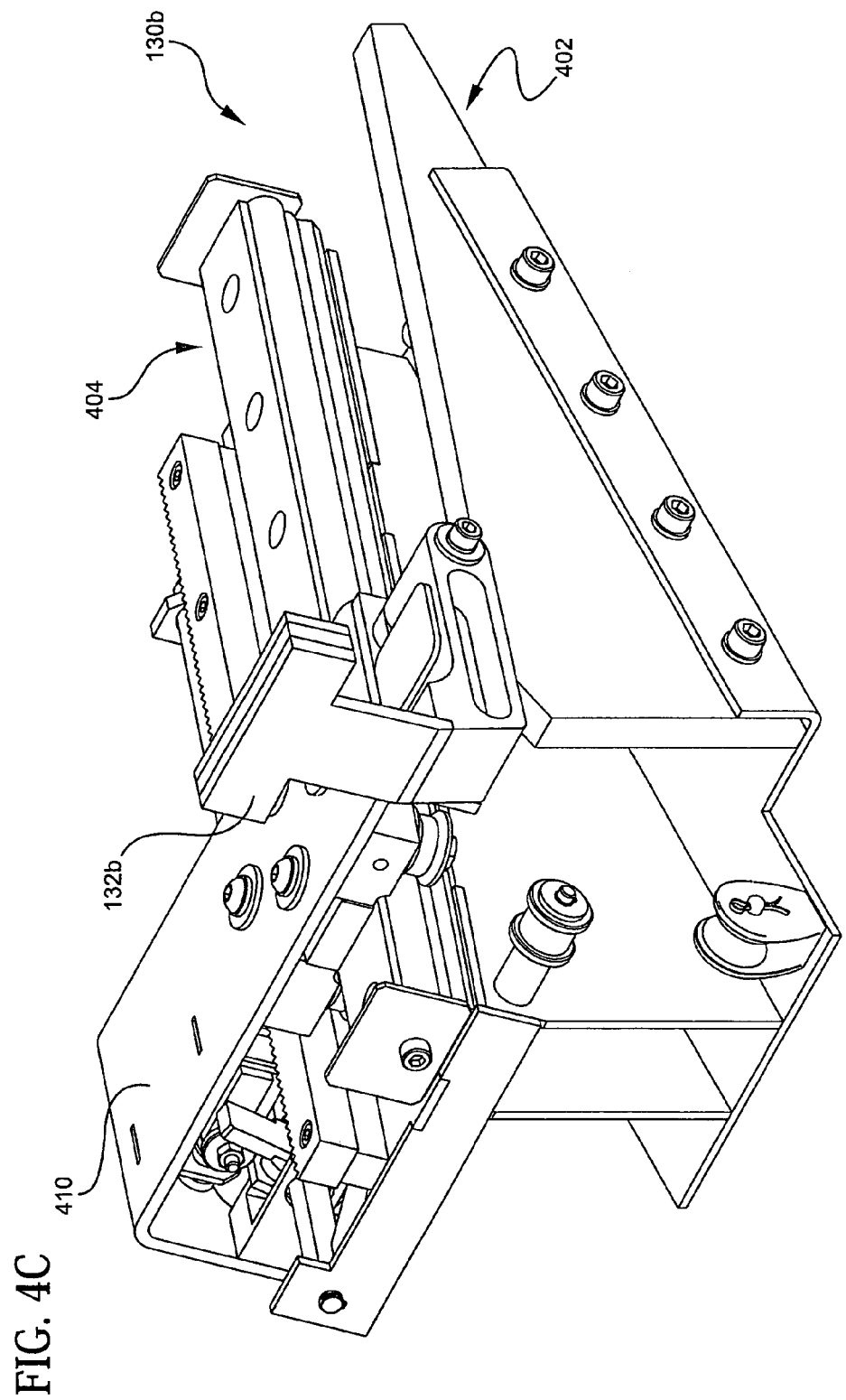
Figure 4D:
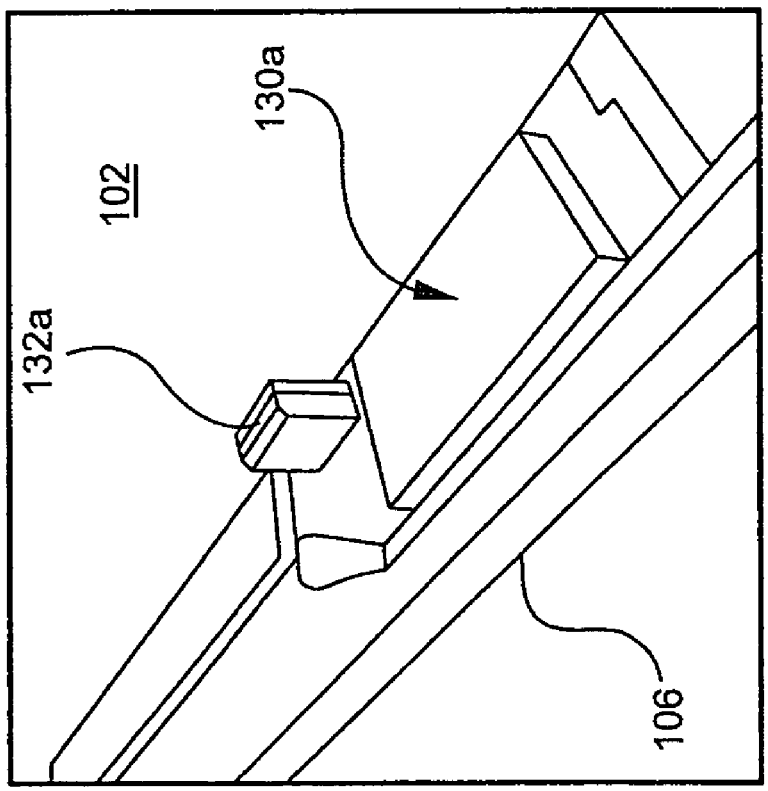

Basically, each secondary retainer mechanism 130a and 130b has a stopper 132a and 132b that is moved from a disengaging position into an engaging position and then pushed towards the bottom portion of the glass sheets 102 to prevent the glass sheets 102 from slipping forward after for instance the support bar 122 has been removed from between the two collapsible retainer bar mechanisms 120a and 120b (see FIGS. 1C and 4D). As shown in FIGS. 4A-4E, the secondary retainer mechanisms 130a and 130b each includes a rail glide stopper assembly 402 on which the rail linear glide 404 is secured. The rail linear glide 404 includes the gear track 406 and the linear slide 408. The mounting bracket 410 has the stopper 132a and 132b and the pawl 412 secured thereto and when the pawl 412 interfaces with the gear track 406 (located on the rail linear glide 404) then the linear slide 408 (located on the rail linear glide 404) and the mounting bracket 410 (including the stopper 132a and 132b and the pawl 412) can be manually moved by a user towards the back side 109 of the frame 104 so the stopper 132a can contact the bottom portion of the glass sheets 102 (see FIG. 4D). In this position, the stopper 132a is held in place because the pawl 412 (located on the mounting bracket 410) interfaces with the gear track 406 (located on the rail linear glide 404). The other secondary retainer mechanism 130b functions in the same manner to control and support the bottom portion of the glass sheets 102.

Figure 4E:
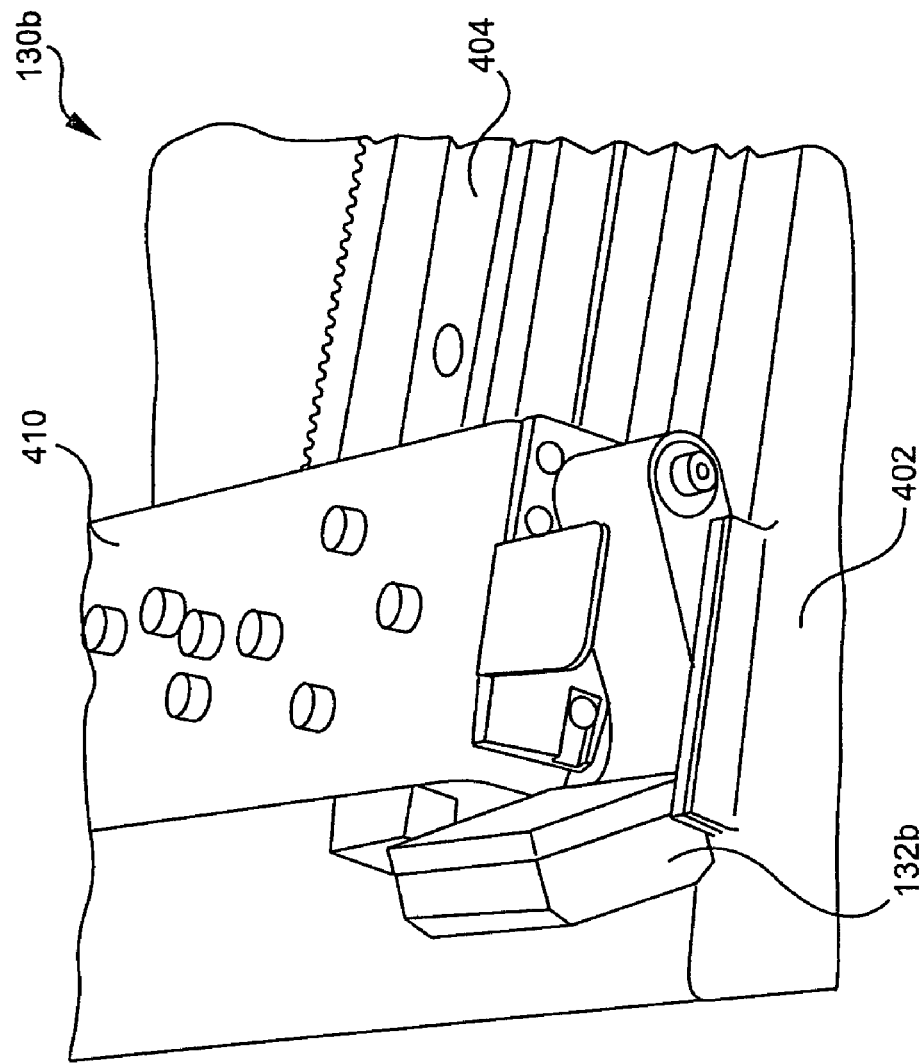

At some point, the user is going to want the stoppers 132a and 132b to be moved away from the bottom portion of the glass sheets 102 and into the disengaging position so the glass sheets 102 can be safely removed from the container 100 (or inserted into the container 100) (see FIG. 4E). To accomplish this, each secondary retainer mechanism 130a and 130b needs to have their respective pawl 412 (located on the mounting bracket 410) moved away from the gear track 406 (located on the rail linear glide 404) such that it no longer interfaces with the gear track 406 and then the linear slide 408, the mounting bracket 410 and the respective stopper 132a and 132b can be moved away from the back side 109 of the frame 104 and the glass sheets 102 (if present) and placed in the disengaging position (see FIG. 4E).

Figure 4F:
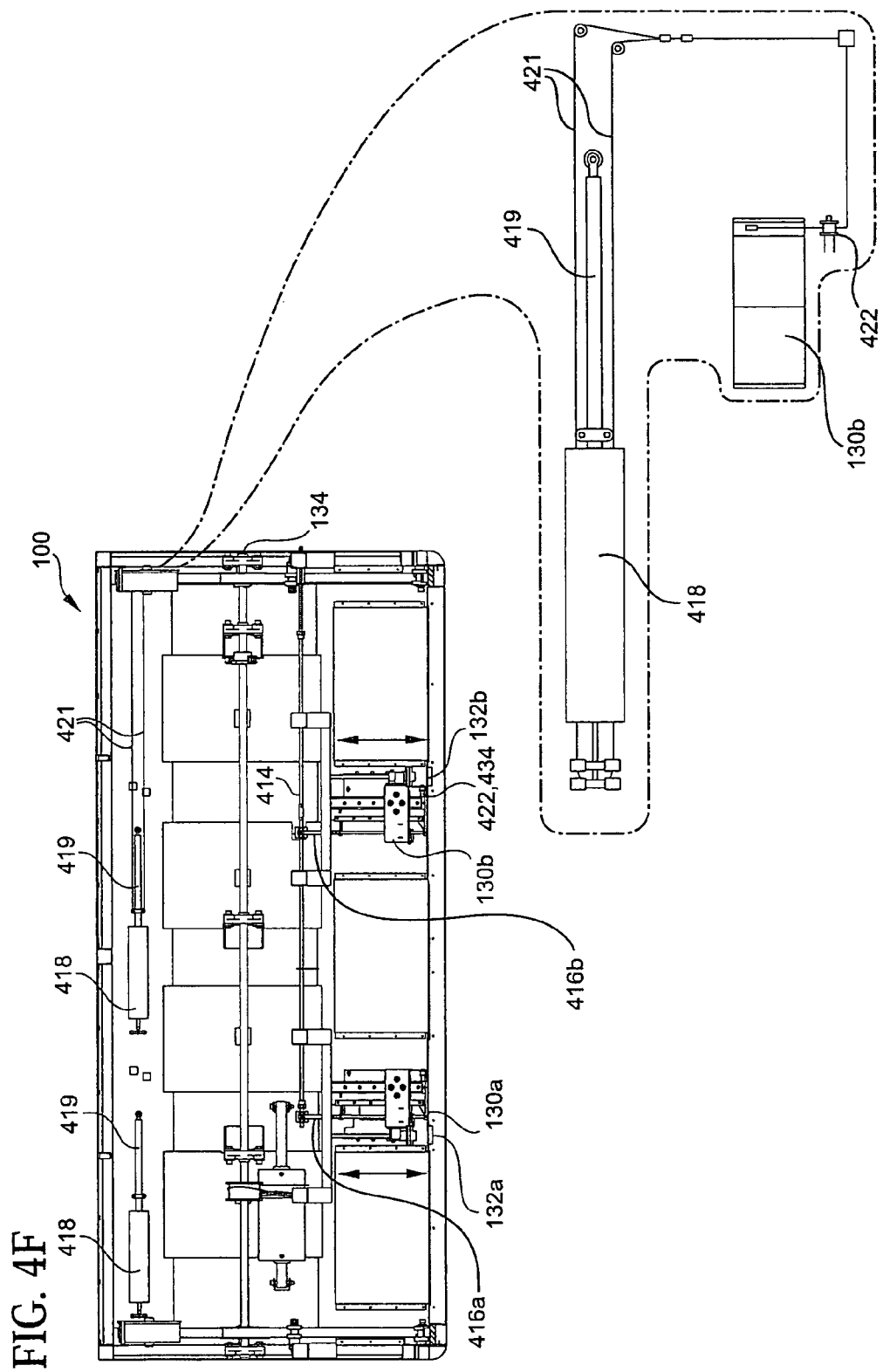

Referring to FIG. 4F, there is a cross-sectional top view of the container 100 which is used to explain one way that a user can automatically move the stopper 132a and 132b from the engaging position into the disengaging position by pressing a button 134 (see FIGS. 1A and 1C). The button 134 is connected to a rod 414 which interfaces with two retainer release bars 416a and 416b (attached to the rail glide stopper assembly 402) on the two secondary retainer mechanisms 130a and 130b which moves the pawls 412 away from the gear tracks 406 so that both stoppers 132a and 132b can be moved away from the back side 109 of the frame 104. The button 134 is also coupled to a pair of gas springs 418 which are compressed so when the button 134 is pushed they decompress to extend a the gas spring pistons 419 coupled to cables 421 (which are routed through a series of pulleys and wire guides 422/434) that are connected to the mounting brackets 410 such that the mounting brackets 410 (and the stoppers 132a and 132b) are automatically pulled away from the glass sheets 102 and placed into the disengaging position. The pistons 418 become compressed when the stoppers 132a and 132b are moved towards the glass sheets 102. Of course, this is just one exemplary way to automatically move the stoppers 132a and 132b away from the glass sheets 102 and into the disengaging position. If desired, the stoppers 132a and 132b could be manually pulled away from the glass sheets 102 and placed into the disengaging position.

Referring back to FIG. 4A, there is shown an exploded view of the secondary retainer mechanism 130b which illustrates in greater detail the different components and the configurations of those components which make-up the rail glide stopper assembly 402, the rail linear glide 404 and the mounting bracket 410. These components are as follows:

Secondary Retainer Mechanism 130b
    Rail Glide Stopper Assembly 402
    retainer release 416b
    bottom plate 420
    pulley/wire guide 422
    plate support 424
    shaft/wire guide support 426
    plate release bar support 428
    support plate 430
    release shaft 432
    ring/wire guide 434
    Rail Linear Glide 404
    gear track 406
    linear slide 408
    rail 436
    spacer 438
    stopper 440
    Mounting Bracket 410
    stopper 132b
    pawl 412
    stopper assembly bracket 442
    bracket slide assembly 444
    pawl support 446
    bracket release limiter 448
    retainer release 450

It is important to understand that the secondary retainer mechanisms 130a and 130b shown and described herein are exemplary and that different types/configurations of secondary retainer mechanisms could be used instead so long as those secondary retainer mechanisms can be used to support the bottom portion of the glass sheets 102. Moreover, it is important to understand that the container 100 may also incorporate as many of the secondary retainer mechanisms (including just one secondary retainer mechanism) as are needed to properly hold the bottom portion of the glass sheets 102 (note: two secondary retainer mechanisms 130a and 130b have been shown in the FIGS. 1A-1C).

Referring to FIGS. 5A-5F, there are six diagrams which are used to help explain the structure of the door 112 which is movably secured to the container 100 in accordance with the present invention. The door 112 can be opened and closed by turning a handle 136 (see FIG. 1C) which interfaces with a counter-balanced drive mechanism 500 that makes it easy for the user to move the door 112 (which can be relatively heavy) in a controlled manner (i.e., smoothly and slowly) from the closed position to the open position and vice-versa. Alternatively, the user can use a motor driven device instead of the handle 136 to open-and-close the door 112. The exemplary counter-balanced drive mechanism 500 shown herein has the following components (see FIGS. 5A-5D):

Counter-Balance Mechanism 500
    wheels 502a . . . 502f
    belt drive gear 504
    pulley 506
    counter-balance 508
    belt track 510
    tensioner 512
    pulley 514
    chain 516
    pulley 518
    gear reducer 520
    pulley 522
    gear 524
    main drive shaft 526

Figure 5A:
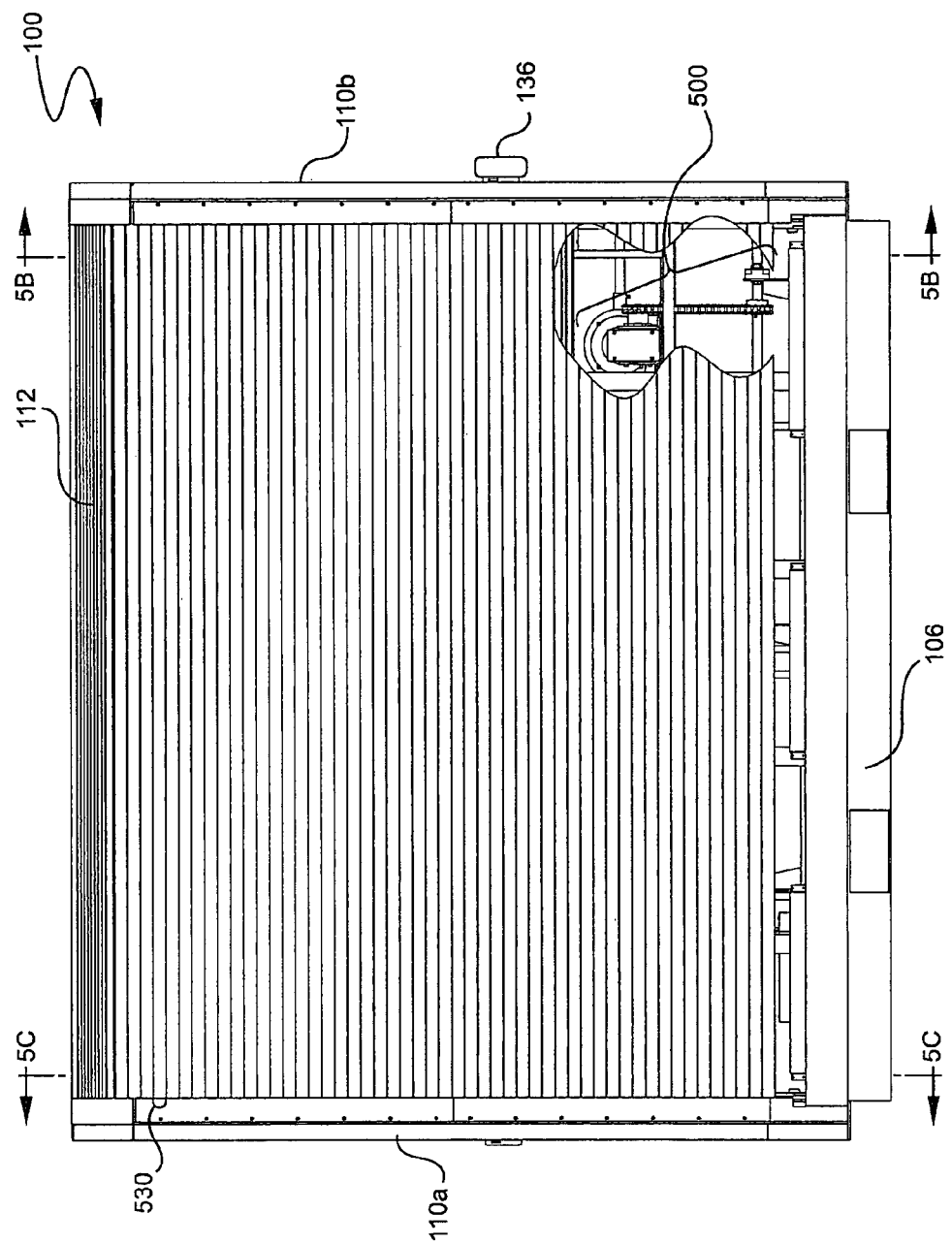
Figure 5C:
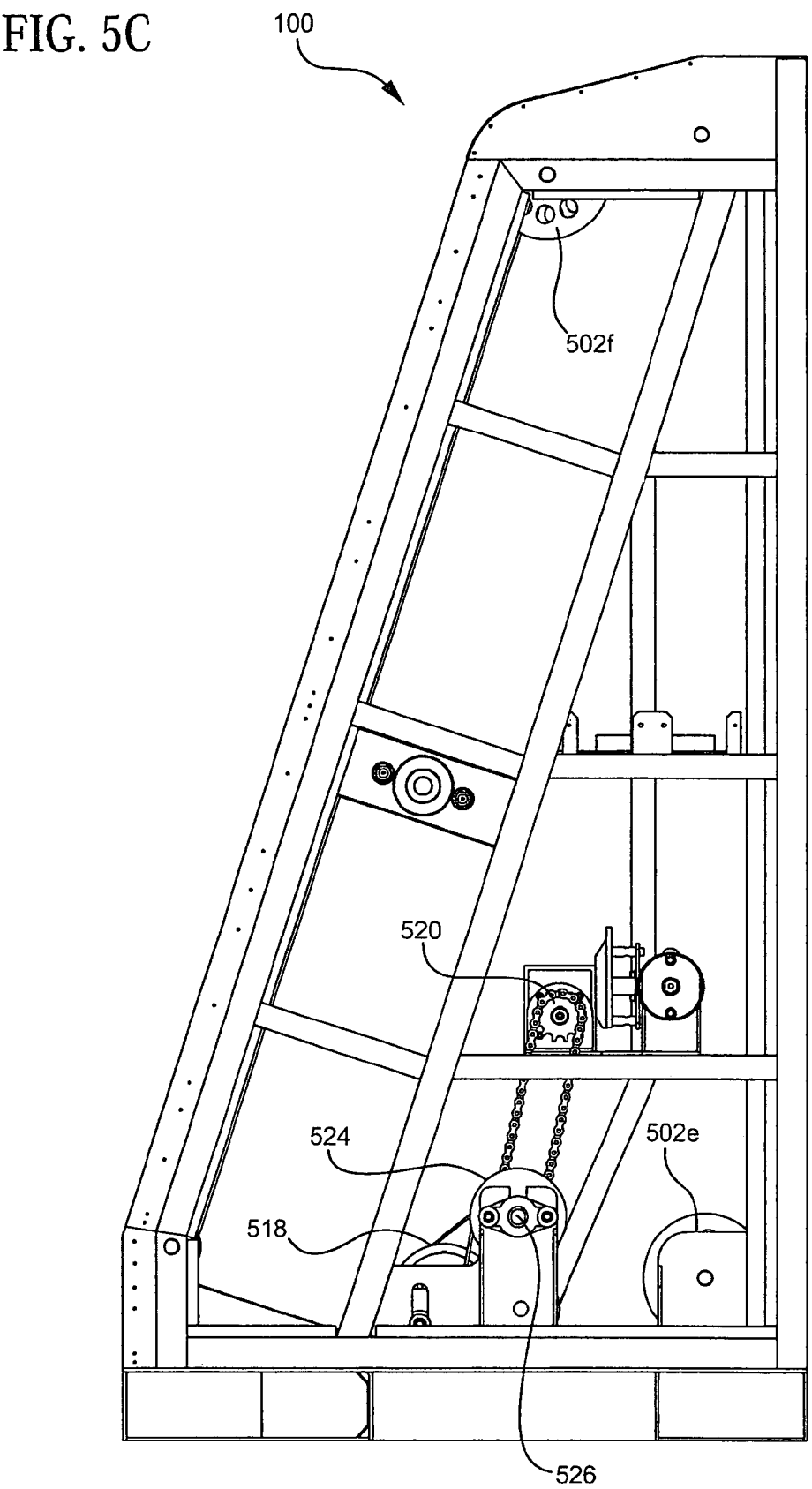
Figure 5D:
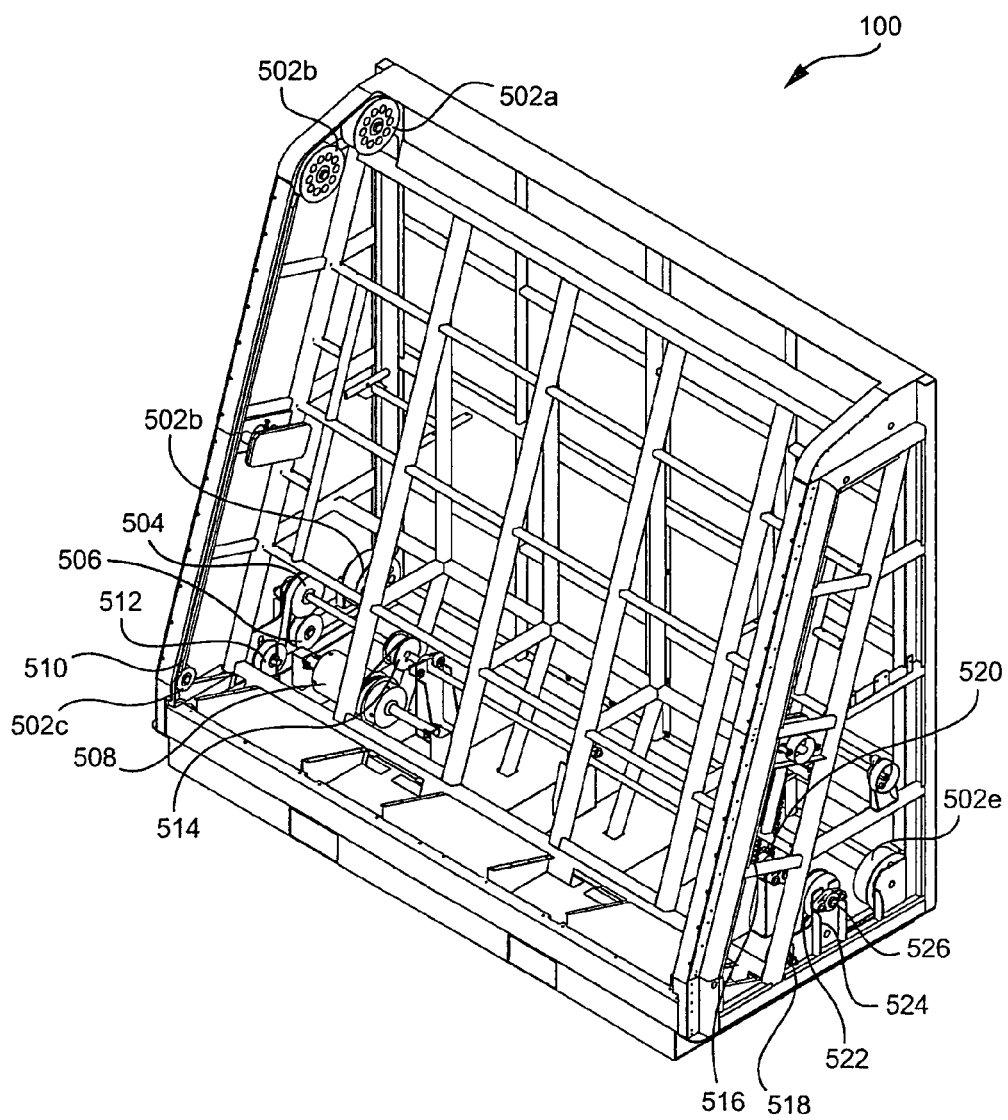
Figure 5F:
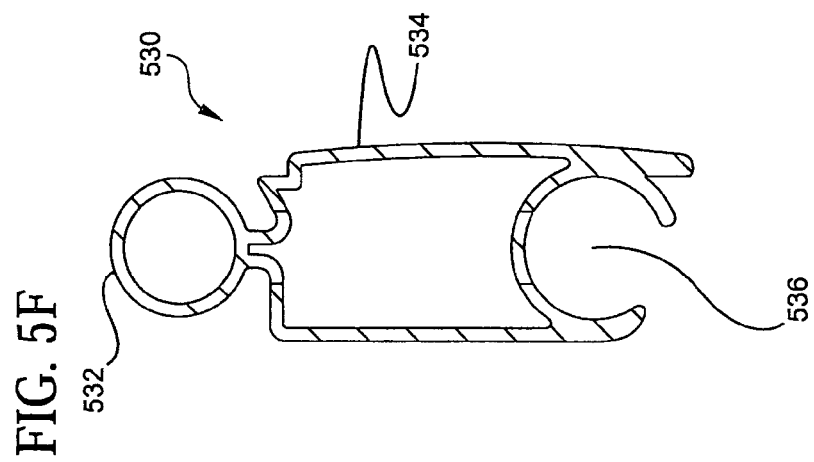
Figure 5E:
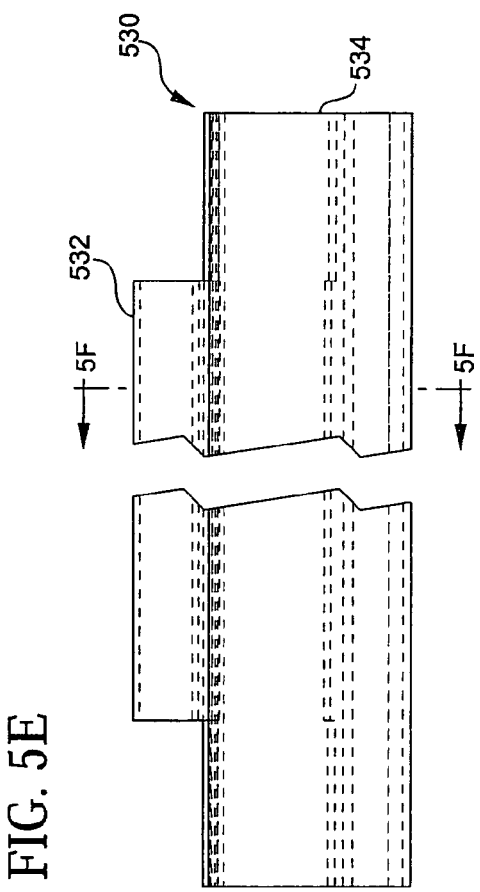

The door 112 is constructed from a series of cover slats 530 which are movably interlocked with one another in a manner that prevents external dust and dirt from passing into an interior of an enclosed container 100 (see FIGS. 5E and 5F). As shown in FIGS. 5E-5F, each cover slat 530 has a one or more round portions 532 (one shown) which are attached to one end of a body 534 that has a receiving portion 536 formed in the other end. The round portion 532 is configured and sized to fit within the receiving portion 536 (not shown) of another cover slat 530 (not shown). Thus, the door 112 can be constructed by interlocking a series of these cover slats 530 which enable the door 112 to be opened-and-closed and also help prevent external dust and dirt from passing into an interior of a closed container 100 (note: the door 112 can be made from alternating PVC cover slats 530 and aluminum cover slats 530 plus other materials are possible as well).

Figure 6:
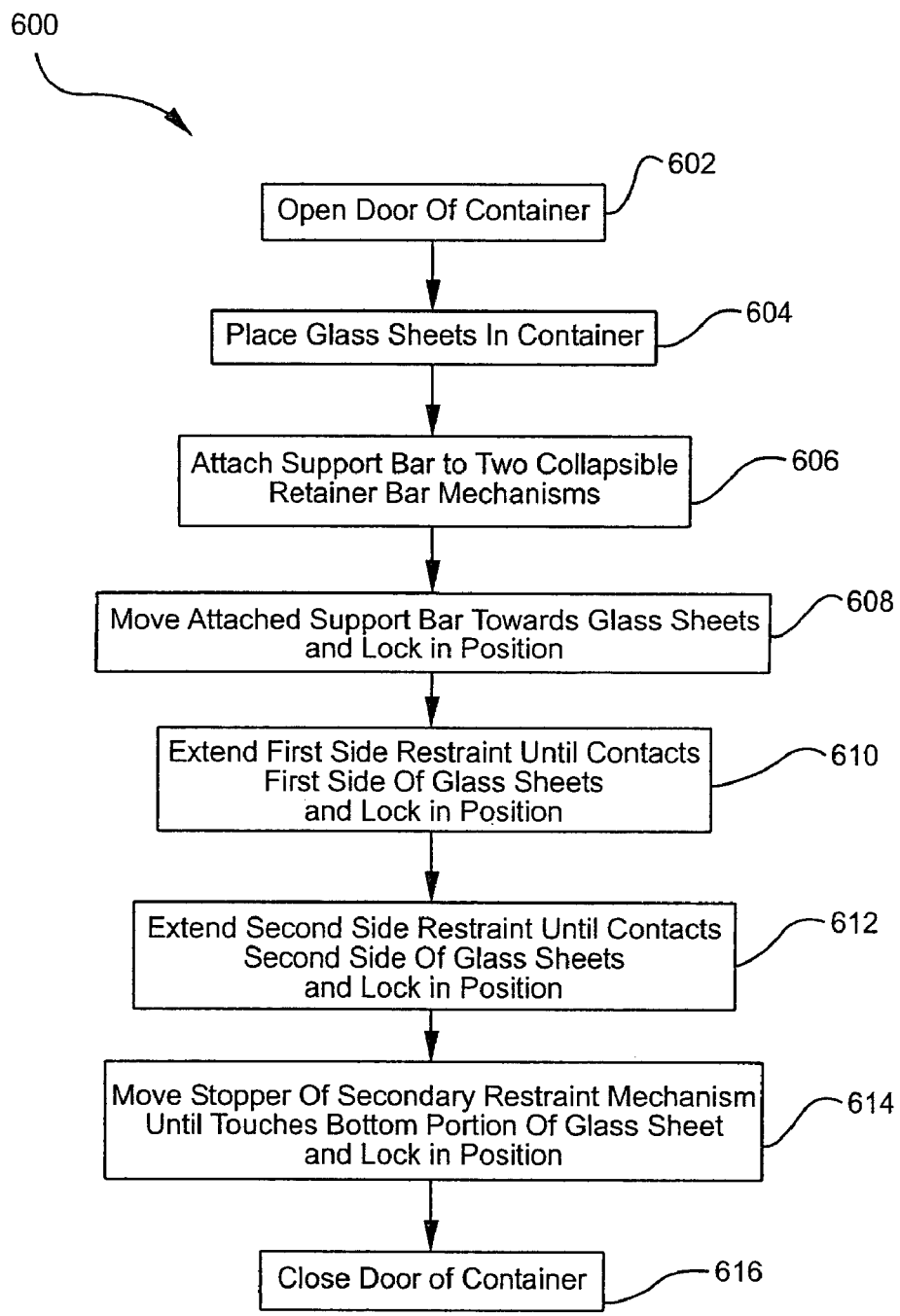
FIG. 6 is a flowchart illustrating the steps of a method for loading one or more glass sheets into the container in accordance with the present invention.

Referring to FIG. 6, there is a flowchart which illustrates the steps of a method 600 for loading one or more glass sheets 102 into the container 100 in accordance with the present invention. Beginning at step 602, the user would open the door 112 which is movably secured to the frame 104 of the container 100. At step 604, the user would place the glass sheets 102 into the container 100. At step 606, the user would attach the support bar 122 onto a pair of the collapsible retainer bar mechanisms 120a and 120b. At step 608, the user would move the support bar 122 which is attached to the pair of collapsible retainer bar mechanisms 120a and 120b towards a back side 109 of the frame 104 until the support bar 122 is in a position to support the major surface of the first glass sheet 102 in a manner that secures all of the glass sheets 102 within the container 100 and then lock the support bar 122 into position (note: this step would be repeated if more than one pair of retainer bar mechanisms 120a and 120b were used). At step 610, the user would extend the first side restraint 126a which is adjacent to the first side-wall 110a of the frame 104 until the first side restraint 126a contacts/supports the first sides 128a of the glass sheets 102 and then lock the side restraint 126a into position. At step 612, the user would extend the second side restraint 126b which is adjacent to the second side-wall 110b of the frame 104 until the second side restraint 126b contacts/supports the second sides 128b of the glass sheets 102 and then lock the side restraint 126b into position. At step 614, the user would move the stopper 132a which is part of the secondary retainer mechanism 130a located adjacent to the bottom side 106 of the frame 104 in a manner such that the stopper 132a would travel towards the back side 109 of the frame 104 until it contacts/supports the bottom portion of the first glass sheet 102 (note: this step would be repeated if more than one secondary retainer mechanism was used). At step 616, the user would close the door 112 to enclose the secured glass sheets 102 within the container 100.

Figure 7:
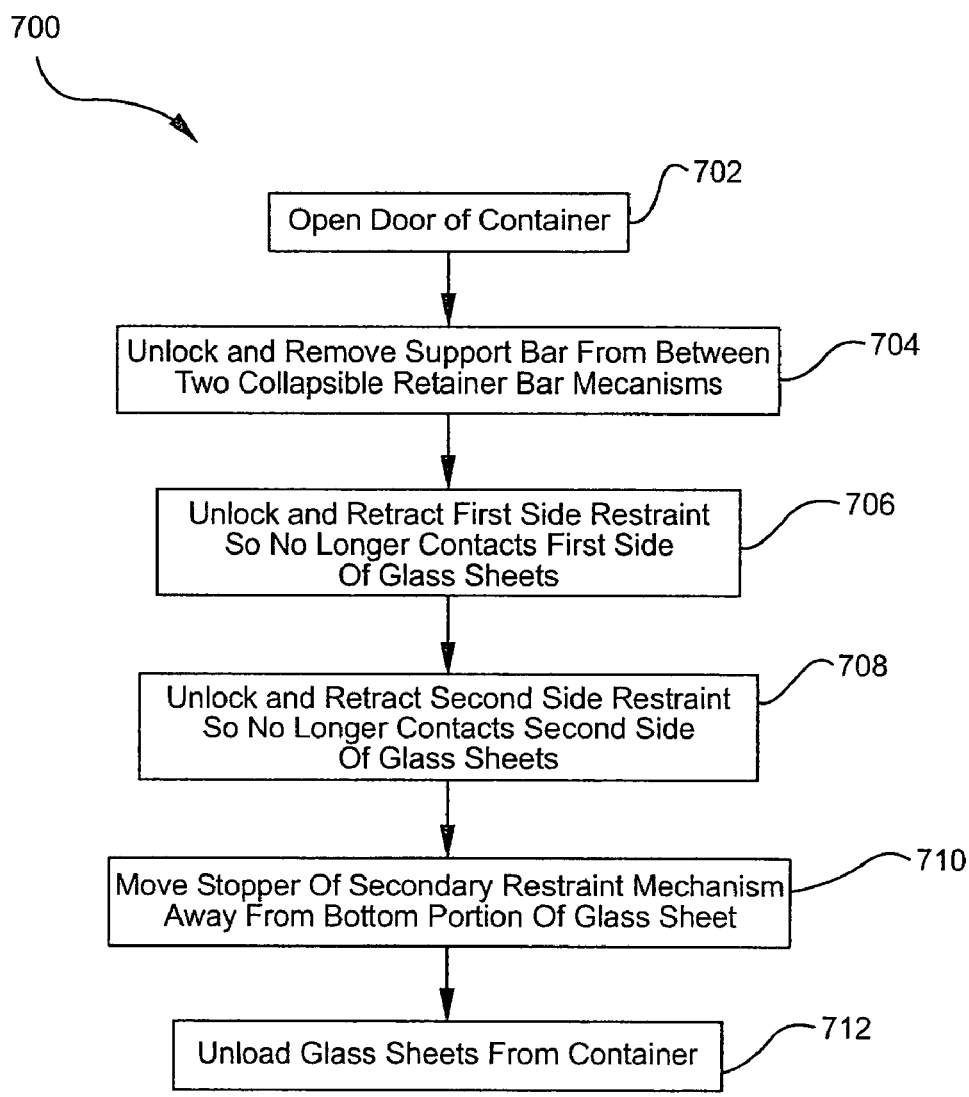
FIG. 7 is a flowchart illustrating the steps of a method for unloading one or more glass sheets from the container in accordance with the present invention.

Referring to FIG. 7, there is a flowchart which illustrates the steps of a method 700 for unloading one or more glass sheets 102 from the container 100 in accordance with the present invention. Beginning at step 702, the user would open the door 112 which is movably secured to the frame 104 of the container 100. At step 704, the user would unlock and remove the support bar 122 which was attached to a pair of collapsible retainer bar mechanisms 120a and 120 (note: this step would be repeated if more than one pair of retainer bar mechanisms 120a and 120b were used). At step 706, the user would unlock and retract a first side restraint 126a which is adjacent to the first side-wall 110a of the frame 104 until the first side restraint 126a no longer contacts/supports the first sides 128a of the glass sheets 102. At step 708, the user would unlock and retract a second side restraint 126b which is adjacent to the second side-wall 110b of the frame 104 until that the second side restraint 126b no longer contacts/supports the second sides 128b of the glass sheets 102. At step 710, the user would move a stopper 132a which is part of the secondary retainer mechanism 130a located adjacent to the bottom side 106 of the frame 104 in a manner such that the stopper 132a travels away from the back side 109 of the frame 104 and no longer supports the bottom portion of the first glass sheet 102 (note: this step would be repeated if more than one secondary retainer mechanism was used). At step 712, the user would then unload the glass sheets 102 from the container 100.

A detailed description is provided next about an exemplary standard operating procedure that can be used by plant personnel for loading the glass sheets 102 into the container 100 and for unloading the glass sheets 102 from the container 100. The exemplary standard operating procedure has the following steps:

Prepare for Glass Loading

1. Open the shutter door 112 of container 100 using a hand wheel 136 (or if desired a power assisted device). Ensure that the door 112 is fully opened before proceeding to step 2.
2. Ensure the retainer bars have been removed and placed in storage compartment 138 or other temporary storage location.
3. Ensure the collapsible retainer bar mechanisms 120a and 120b are pushed into the fully-retracted position (FIG. 2G).
4. Ensure the cam levers 215 on the end of each support unit 214 in the collapsible retainer bar mechanisms 120a and 120b are in the released (down) position.
5. Ensure the locking/unlocking actuators 206 in the collapsible retainer bar mechanisms 120a and 120b are in locked (down) position.
6. Ensure the stoppers 132a and 132b in the secondary restraint mechanisms 130a and 130b are in the disengaged position (FIG. 4E). If not, press the release button 134 on the side of the container 100 to move the stoppers 132a and 132b into the disengaged position.
7. Ensure the side restraints 126a and 126b are fully retracted to have the maximum opening by turning the knobs 334 on the sides of the container 100. Visually check the opened position.

Load Glass into Container

1. Prior to loading the glass sheets 102, the user should put on the appropriate safety glasses, gloves etc. . . . as required by the plant safety officer.
2. Use the appropriate material handling equipment to transfer and place the glass sheets 102 into the container 100.
3. Ensure a piece of interleaf paper is positioned between each pair of glass sheets 102.
4. Ensure the glass sheets 102 and the interleaf papers are positioned in the container 100 according to the product code specification for centering, fanning, and paper overhang.

Secure Glass in Container

Figure 2D:
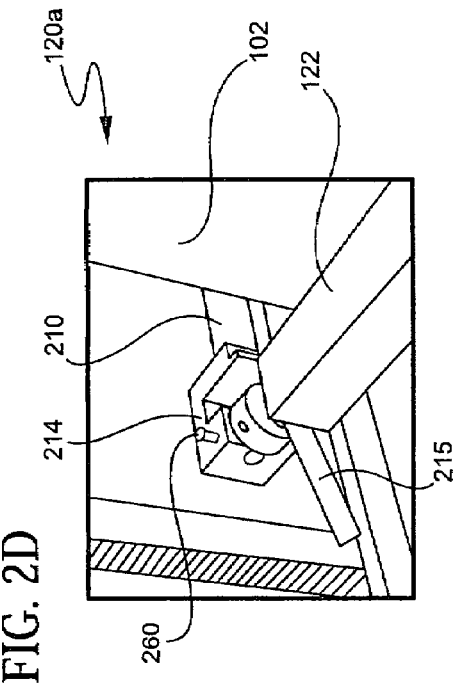
Figure 3C:
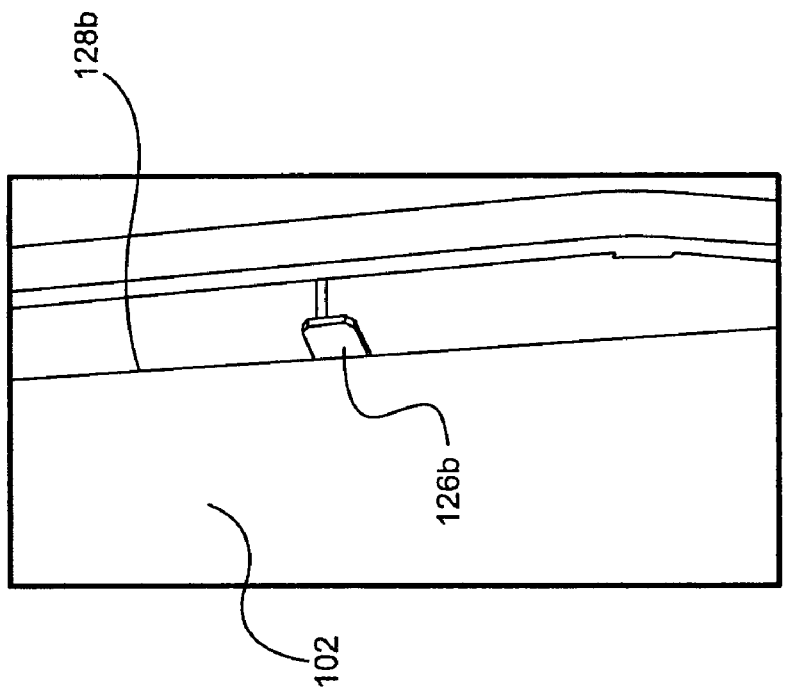

1. Unlock (up position) the locking/unlocking actuators 206 that are associated with the collapsible retainer bar mechanisms 120a and 120b.
2. Pull the support arms/rods 210 on the collapsible retainer bar mechanisms 120a and 120b until they are fully extended (FIG. 2C).
3. Obtain a support bar 122 from the storage tubes 138 (located within the container 100) or from some other temporary storage location.
4. With a padded side of the support bar 122 facing the glass sheets 102, install the ends of the support bar 122 into the support units 214 located on the support arms/rods 210 of the collapsible retainer bar mechanisms 120a and 120b.
5. Move the support bar 122 towards the glass sheets 102 until it contacts a major surface of the first glass sheet 102 (FIG. 2F).
6. Lock (down position) the locking/unlocking actuators 206 that are associated with the collapsible retainer bar mechanisms 120a and 120b.
7. Press firmly on each end of the support bar 122. A "click" may be heard as the support arms/rods 210 contract and then lock into position.
8. Rotate the cam lever 215 on the end of each support arm/rod 210 to the locked (up) position. This fully secures the support bar 122 against the major surface of the first glass sheet 102 (FIGS. 2D-2E). Lock cam lever into upright position using locking pin 216 (see FIG. 2A).
9. Repeat steps 3-8 when utilizing two separate pairs of the collapsible retainer bar mechanisms 120a and 120b (FIG. 1C).
10. Rotate the knob 334 on side 110a of the container 100, to extend the side restraint 126a until it contacts the first sides 128a of the stack of glass sheets 102 (FIG. 3C). The interleaf paper near the side restraint 126a could be bent over by this action. The side restraint 126a does not necessarily need to apply pressure (force) to the sides 128a of the glass sheets 102 to prevent side shifts, but it should be in firm contact. Repeat step 10 for the other side restraint 126b. Lock restraint into position with locking pin 332.
11. Raise the support 132a of the secondary restraint mechanism 130a from the bottom of the container 100 and guide it towards the glass sheets 102. Push the support 132a forward until it contacts the bottom portion of the first glass sheet 102 (FIG. 4D). A main function of the support 132a is to prevent the glass sheets 102 from slipping forward when the support bar(s) 122 of the collapsible retainer bar mechanisms 120a and 120b have been removed. Repeat step 11 for the other secondary restraint mechanism 130b.
12. The glass sheets 102 are now fully secured and the container 100 is ready to be closed.
13. Close the shutter cover/door 112 using the hand wheel 136 (or if desired a power assist device).
14. Attach any product ID labels to the container 100.
15. Container 100 is now ready to be shipped.

Prepare for Glass Unloading

1. Open shutter cover/door 112 using the hand wheel 136 (or if desired a power assist device).
2. Disengage locking pin 260 on each cam lever. Rotate the cam levers 215 on the ends of each support arm/rod 210 of the collapsible retainer bar mechanisms 120a and 120b to the released (down) position.
3. Unlock (up position) the locking/unlocking actuators 206 that are associated with the collapsible retainer bar mechanisms 120a and 120b.
4. Pull the upper support bar 122 as far away as possible from the glass sheets 102.
5. Carefully remove the support bar 122 and place it within the storage tube 138. Close the door of the storage tube 138.
6. Repeat steps 4 and 5 for the lower support bar 122 (if present).
7. Push all of the support arms/rods 210 of the collapsible retainer bar mechanisms 120a and 120b into the container 100, as far as they will go.
8. Place the locking/unlocking actuators 206 on the collapsible retainer bar mechanisms 120a and 120b in the locked (down) position.
9. Disengage the locking pin 332 on one side of container. Use the knob 334 on one side 110a of the container 100, to retract one side restraint 126a away from the glass sheets 102. Ensure that the side restraint 126a has been fully retracted by turning the knob 334 until it will no longer turn any further.

10. Repeat step 9 for the other side restraint 126b.

11. Press the button 134 on the side of the container 100 to move the stoppers 132a and 132b of the secondary retainer mechanisms 130a and 130b away from the glass sheets 102.

12. Proceed to unload the glass sheets 102.

Prepare for Return Shipment

1. Once the glass sheets 102 have been unloaded, the container 100 may be prepared for return shipment.
2. Ensure the support arms/rods 110 are pushed into the container 100 as far as they will go and then make sure that the locking/unlocking actuators 206 of the collapsible retainer bar mechanisms 120a and 120b are in the locked (down) position.
3. Ensure the support bars 122 are placed in the storage tubes 138 and the tube covers are closed and latched.
4. Close the shutter cover/door 112 using the hand wheel 136 (or if desired a power assist device).
5. The container 100 is now ready for return shipment.

Following are some advantages, features and uses of the present invention:

- The container 100 can be shipped, returned, cleaned and reused repeatedly.
- The container 100 does not need to be over-wrapped with plastic etc. to ensure the cleanliness and protection of the enclosed glass sheets 102.
- The container 100 can be used to secure different sizes of glass sheets 102 and different numbers of glass sheets 102.
- The container 100 provides for improved overall package functionality and compatibility with automated material handling systems.
- The container 100 incorporates secondary restraining mechanisms 130a and 130b which can be used to hold the bottoms of glass sheets 102 such that the glass sheets 102 will not shift out of position while the container 100 is being moved through a production facility (in this situation the collapsible retainer bar mechanisms 120a and 120b would normally not be used to secure the glass sheets 102).

Although one embodiment of the present invention has been illustrated in the accompanying Drawings and described in the foregoing Detailed Description, it should be understood that the invention is not limited to the disclosed embodiment, but is capable of numerous rearrangements, modifications and substitutions without departing from the spirit of the invention as set forth and defined by the following claims.

The invention claimed is:

1. A container for packaging and transporting one or more glass sheets, comprising:
    a frame;
    a door movably secured to said frame such that when said door is in a closed position then said glass sheet(s) if present would be enclosed within said frame and when said door is in an open position then said glass sheet(s) if present could be removed from said frame;
    one or more pairs of collapsible retainer bar mechanisms where a first of the collapsible retainer bar mechanisms is adjacent to a first side-wall of said frame and a second of the collapsible retainer bar mechanisms is adjacent to a second side-wall of said frame and when a support bar is attached between the first and second collapsible retainer bar mechanisms then the support bar can be moved towards a back side of said frame to secure said glass sheet(s) within said frame and when the support bar is removed from the first and second collapsible retainer bar mechanisms then said glass sheet(s) can be removed from said frame.

2. The container of claim 1, wherein each collapsible retainer bar mechanism includes:
    a mounting bracket including a locking/unlocking actuator;
    a body; and
    a rod including a support unit which is configured to receive an end of the support bar, wherein the locking/unlocking actuator while in a locked position prevents said rod and said body from moving with respect to said mounting bracket, and wherein the locking/unlocking actuator while in an unlocked position enables said rod and said body to be moved into-and-out from said mounting bracket.

3. The container of claim 2, wherein said locking/unlocking actuator is manually operated such that a user can manually lock said rod and said body into a fixed position relative to said mounting bracket.

4. The container of claim 1, further comprising one or more pairs of side restraints where a first of the side restraints is adjacent to a first side-wall of said frame and a second of the side restraints is adjacent to the second side-wall of said frame, wherein the first and second side restraints have protective plates that can be moved to contact opposing sides of said glass sheet(s) while said glass sheet(s) are located within said frame, and wherein the first and second side restraint protective plates that can be moved-away from the opposing sides of said glass sheet(s) to enable said glass sheet(s) to be removed from said frame.

5. The container of claim 4, wherein each side restraint includes a support plate which is connected to a respective one of the protective plates via one or more shafts, wherein one of the shafts is turned one-way to move the protective plate away from the support plate so the protective plate contacts one side of said glass sheet(s) when said glass sheet(s) are secured within said frame, and wherein the one shaft is turned another-way to move the protective plate towards the support plate so the protective plate no longer contacts the one side of said glass sheet(s) to enable said glass sheet(s) to be removed from said frame.

6. The container of claim 5, wherein said one of the shafts is manually turned so a user can move the protective plate towards or away from the one side of said glass sheet(s).

7. The container of claim 1, further comprising one or more secondary retainer mechanisms which are located adjacent to a bottom side of said frame and each of which secondary retainer mechanisms has a stopper that can be placed in either an engaging position or a disengaging position, wherein said stopper while placed in the engaging position can be moved towards the back side of said frame to support a bottom portion of said glass sheet(s) such that said glass sheet(s) are prevented from slipping forward and out of said frame when the support bar has been removed from between the first and second collapsible retainer bar mechanisms, and wherein said stopper can be moved away from the back side of said frame and placed in the disengaging position so that said glass sheet(s) can be removed from the frame when the support bar has also been removed from between the first and second collapsible retainer bar mechanisms.

8. The container of claim 7, wherein each said secondary retainer mechanism includes:

a rail glide stopper assembly;

a rail linear glide secured to said rail glide stopper assembly, where said rail linear glide includes a gear track and a linear slide on top of which is secured a mounting bracket which supports said respective stopper and a pawl, wherein when the pawl interfaces with the gear track then the linear slide and the mounting bracket including the stopper can be moved towards the back side of the frame so the stopper can support the bottom portion of said glass sheet(s), wherein when the pawl does not interface with the gear track then the linear slide including the mounting bracket and the stopper can be moved away from the back side of the frame so the stopper can be placed in the disengaging position such that said glass sheet(s) can be removed from the frame when the support bar has also been removed from between the first and second collapsible retainer bar mechanisms.

9. The container of claim 8, wherein said mounting bracket and said stopper are manually moved towards the back side of the frame so the stopper can support the bottom portion of said glass sheet(s).

10. The container of claim 8, wherein said mounting bracket and said stopper are automatically moved away from the back side of the frame and into the disengaging position at which point said glass sheet(s) can be removed from the frame when the support bar has also been removed from between the first and second collapsible retainer bar mechanisms.

11. The container of claim 1, wherein said door is attached to a counter-balance mechanism which is used to move said door from the closed position to the open position and vice versa.

12. The container of claim 1, wherein said door is formed from a plurality of cover slats which are connected and interlocked with one another in a manner that prevents external dust and dirt from passing between the connected cover slats.

\* \* \* \* \*